(12) United States Patent
Kawashima et al.

(10) Patent No.: US 11,543,711 B2
(45) Date of Patent: Jan. 3, 2023

(54) LIQUID CRYSTAL DISPLAY DEVICE, METHOD FOR DRIVING LIQUID CRYSTAL DISPLAY DEVICE, AND ELECTRONIC DEVICE

(71) Applicant: SEMICONDUCTOR ENERGY LABORATORY CO., LTD., Atsugi (JP)

(72) Inventors: Susumu Kawashima, Kanagawa (JP); Koji Kusunoki, Kanagawa (JP); Kazunori Watanabe, Tokyo (JP); Kei Takahashi, Kanagawa (JP); Shunpei Yamazaki, Tokyo (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 104 days.

(21) Appl. No.: 16/771,360

(22) PCT Filed: Dec. 10, 2018

(86) PCT No.: PCT/IB2018/059809
§ 371 (c)(1),
(2) Date: Jun. 10, 2020

(87) PCT Pub. No.: WO2019/123088
PCT Pub. Date: Jun. 27, 2019

(65) Prior Publication Data
US 2021/0173249 A1    Jun. 10, 2021

(30) Foreign Application Priority Data

Dec. 21, 2017  (JP) .............................. JP2017-244649
Jan. 26, 2018  (JP) .............................. JP2018-011139
Feb. 22, 2018  (JP) .............................. JP2018-029749

(51) Int. Cl.
*G02F 1/1345*  (2006.01)
*G02F 1/133*  (2006.01)
(Continued)

(52) U.S. Cl.
CPC ........ *G02F 1/13454* (2013.01); *G02F 1/1368* (2013.01); *G02F 1/13306* (2013.01); *G02F 1/136213* (2013.01)

(58) Field of Classification Search
None
See application file for complete search history.

(56) References Cited

U.S. PATENT DOCUMENTS 7,184,014 B2   2/2007  Koyama et al.
7,518,592 B2   4/2009  Koyama et al.
(Continued)

FOREIGN PATENT DOCUMENTS

CN  101887689 A  11/2010
JP  05-080354 A  4/1993
(Continued)

OTHER PUBLICATIONS

International Search Report (Application No. PCT/IB2018/059809) dated Apr. 2, 2019.
(Continued)

*Primary Examiner* — Richard H Kim
(74) *Attorney, Agent, or Firm* — Nixon Peabody LLP; Jeffrey L. Costellia

(57) ABSTRACT

A liquid crystal display device including a pixel containing a first memory circuit, a second memory circuit, and a liquid crystal element is provided. The first memory circuit includes a first capacitor. One electrode of the first capacitor is electrically connected to one electrode of the liquid crystal element. The second memory circuit includes a second capacitor. One electrode of the second capacitor is electri-
(Continued)

cally connected to the one electrode of the liquid crystal element. The first memory circuit has a function of storing a charge corresponding to a first signal. The second memory circuit has a function of storing a charge corresponding to a second signal. A voltage is applied to the liquid crystal element by supplying a third signal to the other electrode of the first capacitor and supplying a fourth signal to the other electrode of the second capacitor, whereby an image is displayed.

10 Claims, 20 Drawing Sheets

(51) Int. Cl.
    *G02F 1/1362* (2006.01)
    *G02F 1/1368* (2006.01)

(56) References Cited

U.S. PATENT DOCUMENTS

| 8,884,852 B2 | 11/2014 | Yamamoto et al. |
| 10,140,940 B2 | 11/2018 | Aoki |
| 10,354,574 B2 | 7/2019 | Kobayashi et al. |
| 2010/0289830 A1 | 11/2010 | Yamamoto et al. |
| 2011/0279427 A1 | 11/2011 | Umezaki et al. |
| 2013/0120469 A1 | 5/2013 | Tien et al. |
| 2017/0025080 A1 | 1/2017 | Aoki |
| 2017/0092177 A1 | 3/2017 | Kobayashi et al. |

FOREIGN PATENT DOCUMENTS

| JP | 2002-196306 A | 7/2002 |
| JP | 2010-266494 A | 11/2010 |
| JP | 2011-257746 A | 12/2011 |
| JP | 2012-145655 A | 8/2012 |
| JP | 2017-027012 A | 2/2017 |
| JP | 2017-062474 A | 3/2017 |
| KR | 2010-0122443 A | 11/2010 |
| KR | 2011-0126039 A | 11/2011 |
| TW | 201106323 | 2/2011 |
| TW | 201211994 | 3/2012 |
| WO | WO-2017/051288 | 3/2017 |

OTHER PUBLICATIONS

Written Opinion (Application No. PCT/IB2018/059809) dated Apr. 2, 2019.

$Q1 = C_1(Vw1 - Vr)$ $Q1 = C_1(Vw1 - Vr)$
$Q2 = C_2(Vw2 - Vr)$ $Q1' = C_1(Vdata1 - Vg)$
$Q2' = C_2(Vdata2 - Vg)$
$Q3' = C_3(Vg - Vcom)$

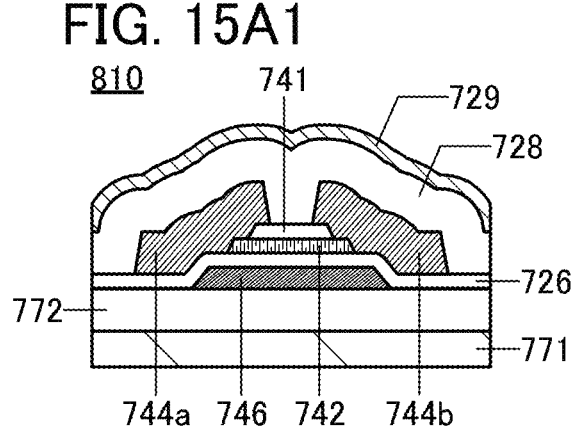
FIG. 15A1
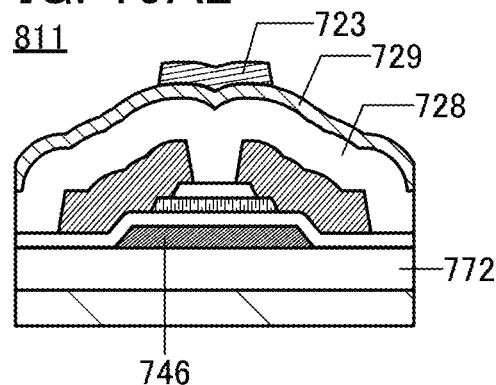
FIG. 15A2
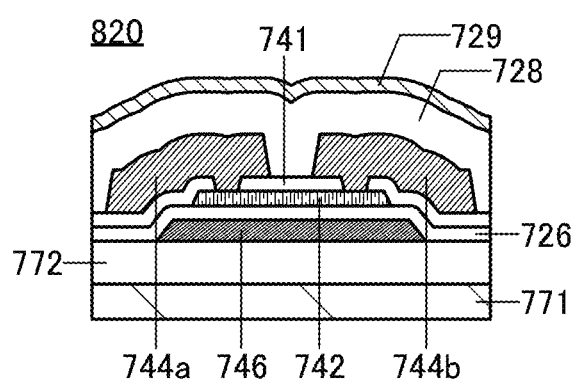
FIG. 15B1
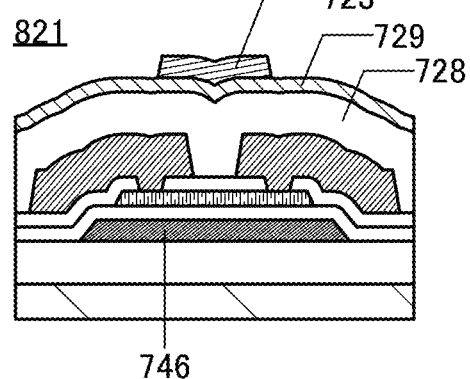
FIG. 15B2
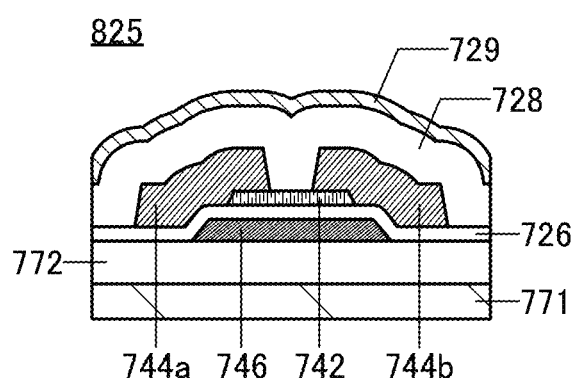
FIG. 15C1
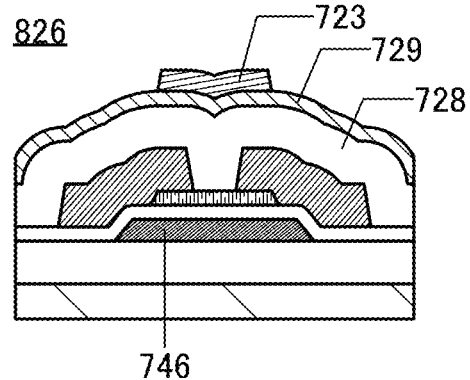
FIG. 15C2

FIG. 16A1
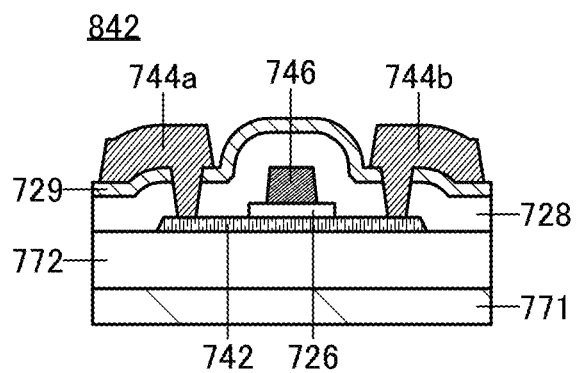
FIG. 16A2
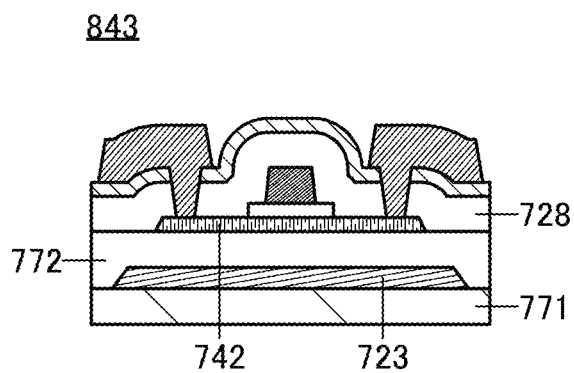
FIG. 16A3
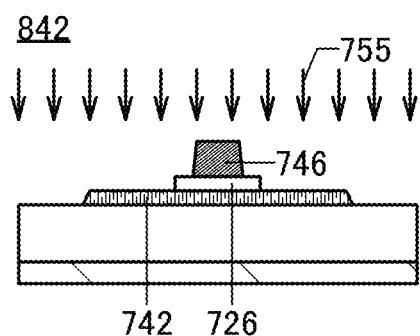
FIG. 16B1
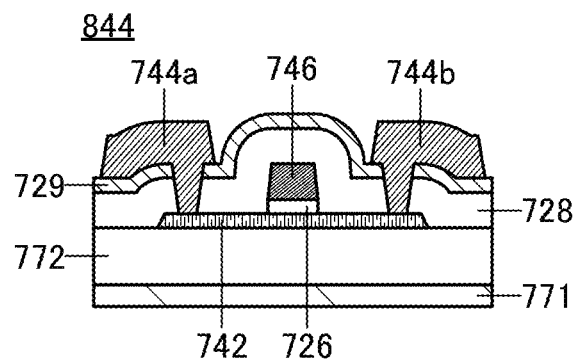
FIG. 16B2
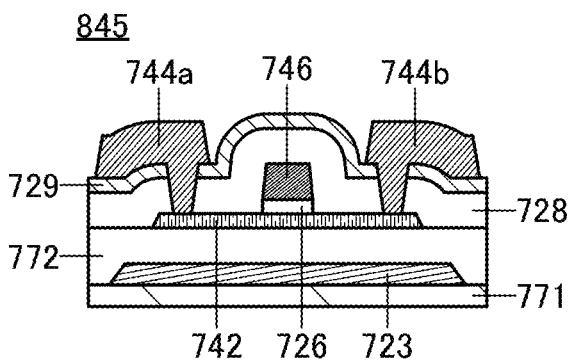
FIG. 16C1
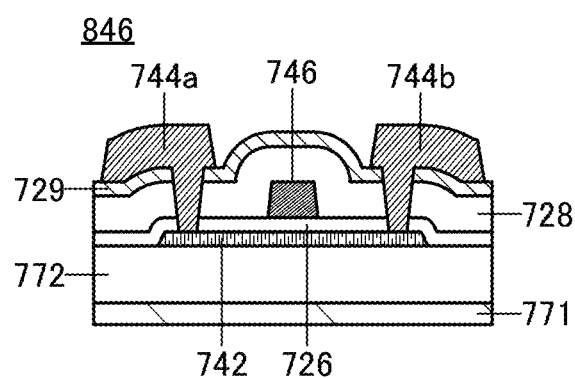
FIG. 16C2
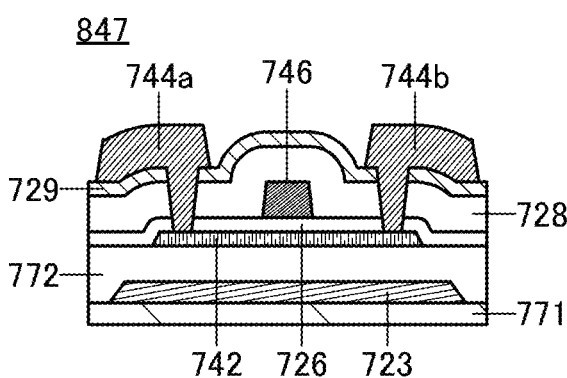

LIQUID CRYSTAL DISPLAY DEVICE, METHOD FOR DRIVING LIQUID CRYSTAL DISPLAY DEVICE, AND ELECTRONIC DEVICE

TECHNICAL FIELD

One embodiment of the present invention relates to a liquid crystal display device, a method for driving the liquid crystal display device, and an electronic device.

BACKGROUND ART

In a liquid crystal display device, the resolution of the display image has been increasing. The number of pixels in the liquid crystal display device has been increasing due to increased resolution. The number of output lines driven by a driver IC, for example, increases with the increase in the number of pixels, which leads to a problem of increased power consumption of the driver IC.

For example, Patent Document 1 discloses a structure where, in order to reduce the power consumption of the driver IC, a boost control circuit is provided in a pixel to enable the driver IC to drive with low voltage amplitude. United States Patent Application Publication No. 2017/0025080

SUMMARY OF THE INVENTION

Problems to be Solved by the Invention

In a liquid crystal display device, in addition to reducing the power consumption of a driver IC, having a high image quality is important. To obtain a high image quality, increasing the number of grayscale levels of an image to be displayed is effective. However, it is difficult to perform display with a number of grayscale levels that is more than or equal to the number of bits that a source driver can output using a driver IC with low voltage amplitude.

One object of one embodiment of the present invention is to provide a liquid crystal display device capable of displaying with a number of grayscale levels that is more than or equal to the number of bits that a source driver can output. Alternatively, one object of one embodiment of the present invention is to provide a liquid crystal display device capable of displaying with a number of grayscale levels exceeding the voltage amplitude of a signal that can be input to a pixel.

In addition, the liquid crystal display device can be made to store data in a pixel, which enables the operation of a driver circuit or the like to stop, thereby reducing power consumption. However, in the liquid crystal display device, inversion driving needs to be performed to reduce the degradation of a liquid crystal element, and it is difficult to perform inversion driving while data is stored in a pixel.

One object of one embodiment of the present invention is to provide a liquid crystal display device that can perform inversion driving even while data is stored in a pixel.

Note that the descriptions of these objects do not preclude the existence of other objects. One embodiment of the present invention does not have to achieve all the objects. Other objects will be apparent from the description of the specification, the drawings, the claims, and the like; and other objects can be derived from the description of the specification, the drawings, the claims, and the like.

Means for Solving the Problems

One embodiment of the present invention is a liquid crystal display device including a pixel containing a first memory circuit, a second memory circuit, and a liquid crystal element. The first memory circuit includes a first capacitor, and one electrode of the first capacitor is electrically connected to one electrode of the liquid crystal element. The second memory circuit includes a second capacitor, and one electrode of the second capacitor is electrically connected to the one electrode of the liquid crystal element. The first memory circuit has a function of storing a charge corresponding to a first signal, and the second memory circuit has a function of storing a charge corresponding to a second signal. A voltage is applied to the liquid crystal element by supplying a third signal to the other electrode of the first capacitor and supplying a fourth signal to the other electrode of the second capacitor.

One embodiment of the present invention is preferably a liquid crystal display device in which the first memory circuit contains a first transistor, a second transistor, and the first capacitor; and the second memory circuit contains the second transistor, a third transistor, and the second capacitor. The first transistor to the third transistor include a metal oxide in channel formation regions, and the metal oxide includes In, Zn, and M (M being Al, Ti, Ga, Sn, Y, Zr, La, Ce, Nd, or Hf).

One embodiment of the present invention is preferably a liquid crystal display device in which the pixel is electrically connected to a first wiring that supplies the first signal or the second signal; the pixel is electrically connected to a second wiring that supplies a reference voltage or the third signal; and the pixel is electrically connected to a third wiring that supplies the reference voltage or the fourth signal. The first transistor has a function of controlling the conduction state between the second wiring and the other electrode of the first capacitor; the second transistor has a function of controlling the conduction state between the first wiring, the one electrode of the first capacitor and the one electrode of the second capacitor; and the third transistor has a function of controlling the conduction state between the third wiring and the other electrode of the second capacitor.

One embodiment of the present invention is preferably a liquid crystal display device in which the pixel includes a third capacitor. One electrode of the third capacitor is electrically connected to the one electrode of the liquid crystal element, and the other electrode of the third capacitor is electrically connected to a fourth wiring that has a function of supplying a common potential.

One embodiment of the present invention is preferably a liquid crystal display device in which a gate of the first transistor is electrically connected to a fifth wiring to which a signal that controls the conduction state of the first transistor is supplied; a gate of the second transistor is electrically connected to a sixth wiring to which a signal that controls the conduction state of the second transistor is supplied; and a gate of the third transistor is electrically connected to a seventh wiring to which a signal that controls the conduction state of the third transistor is supplied.

One embodiment of the present invention is an electronic device including the liquid crystal display device and a camera.

One embodiment of the present invention is a driving method of a liquid crystal display device including a pixel containing a first memory circuit, a second memory circuit, and a liquid crystal element. The first memory circuit includes a first capacitor and the second memory circuit includes a second capacitor. By supplying one electrode of the first capacitor with a reference voltage and the other electrode of the first capacitor with a first signal, a charge corresponding to the first signal is stored in the first memory circuit. By supplying one electrode of the second capacitor with the reference voltage and the other electrode of the second capacitor with a second signal, a charge corresponding to the second signal is stored in the second memory circuit. By supplying the one electrode of the first capacitor with a third signal and the one electrode of the second capacitor with a fourth signal, a voltage is applied to one electrode of the liquid crystal element.

One embodiment of the present invention is preferably a driving method of a liquid crystal display device in which the first signal and the second signal are signals for performing inversion driving.

Note that other embodiments of the present invention will be shown in the description of the following embodiments and the drawings.

Effect of the Invention

One embodiment of the present invention can provide a liquid crystal display device capable of displaying with a number of grayscale levels that is more than or equal to the number of bits that a source driver can output. Alternatively, one embodiment of the present invention can provide a liquid crystal display device capable of displaying with a number of grayscale levels exceeding the voltage amplitude of a signal that can be input to a pixel.

One embodiment of the present invention can provide a liquid crystal display device that can perform inversion driving even while data is stored in a pixel.

Note that the descriptions of the effects do not preclude the existence of other effects. One embodiment of the present invention does not necessarily achieve all the effects. Other effects will be apparent from the description of the specification, the drawings, the claims, and the like and other effects can be derived from the description of the specification, the drawings, the claims, and the like.

BRIEF DESCRIPTION OF THE DRAWINGS

FIG. 15 Diagrams illustrating structure examples of transistors.

FIG. 16 Diagrams illustrating structure examples of transistors.

MODE FOR CARRYING OUT THE INVENTION

Figure 1A:
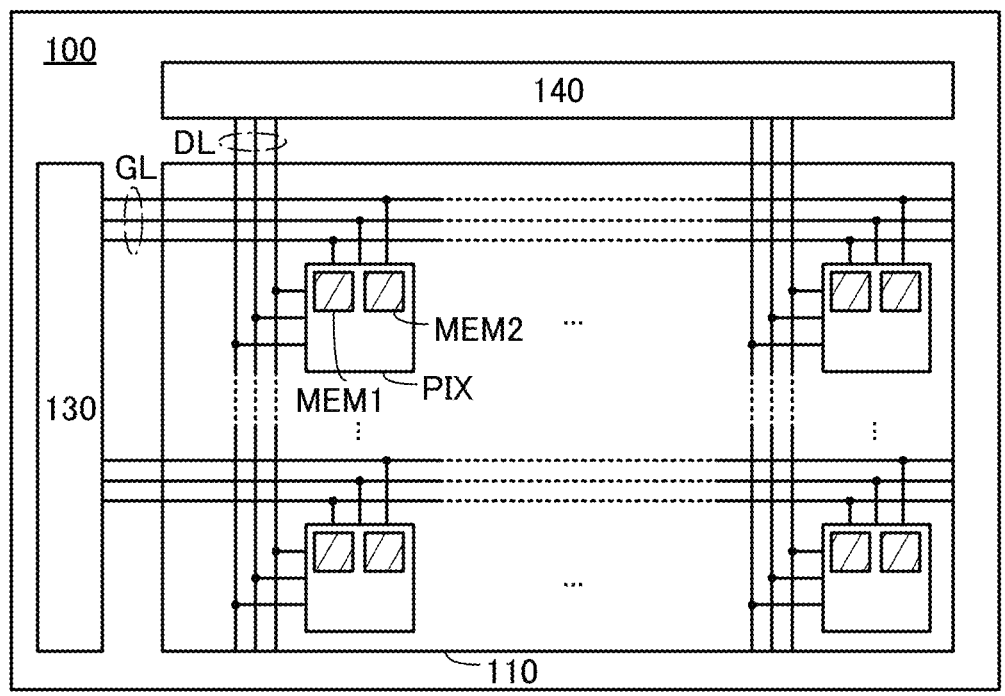
FIG. 1 A block diagram and a circuit diagram each illustrating a structure example of a liquid crystal display device.

Hereinafter, embodiments will be described with reference to drawings. Note that the embodiments can be implemented with many different modes, and it is readily appreciated by those skilled in the art that modes and details can be changed in various ways without departing from the spirit and scope of the present invention. Thus, the present invention should not be interpreted as being limited to the following description of the embodiments.

Note that ordinal numbers such as "first", "second", and "third" in this specification and the like are used in order to avoid confusion among components. Thus, the terms do not limit the number of components. In addition, the terms do not limit the order of components. In this specification and the like, for example, a "first" component in one embodiment can be referred to as a "second" component in other embodiments or claims. Furthermore, in this specification and the like, for example, a "first" component in one embodiment can be omitted in other embodiments or claims.

Note that in the drawings, the same elements, elements having similar functions, elements formed of the same material, elements formed at the same time, or the like are sometimes denoted by the same reference numerals, and repeated description thereof is omitted in some cases.

Embodiment 1

In this embodiment, a liquid crystal display device of one embodiment of the present invention will be described with reference to drawings.

FIG. 1(A) illustrates a block diagram of a liquid crystal display device 100. The liquid crystal display device 100 includes a display portion 110 having a plurality of pixels PIX, a gate driver 130, and a source driver 140.

The pixel PIX includes a memory circuit MEM1 and a memory circuit MEM2. Although not illustrated in FIG. 1(A), the pixel PIX includes a liquid crystal element, a transistor for driving the liquid crystal element, and the like. A signal is supplied from the gate driver 130 to the pixel PIX through a plurality of wirings GL, and driving of the pixel PIX is controlled. A signal is supplied from the source driver 140 to the pixel PIX through a plurality of wirings DL, and driving of the pixel PIX is controlled.

The plurality of wirings GL function as scan lines. A signal transmitted through the wiring GL serves as a scan signal. A scan signal is also referred to as a control signal. The scan signal is a signal for controlling the conduction state or the non-conduction state (on or off) of a transistor serving as a switch in the pixel PIX. The signal transmitted through the wiring GL is output from the gate driver 130.

The plurality of wirings DL function as data lines. A signal transmitted through the wiring DL serves as a data signal. A data signal is also referred to as image data or an image signal. The data signal is a signal for displaying an image. The data signal is not only a signal stored in the memory circuit MEM and the memory circuit MEM2 but also a signal that is supplied later in a state where a signal is stored in the memory circuit MEM1 and the memory circuit MEM2. The wiring DL functions as a wiring for supplying a voltage required for driving the pixel PIX such as a reference voltage. The reference voltage can be changed in accordance with the driving voltage of the liquid crystal element. A signal transmitted through the wiring DL is output from the source driver 140.

The memory circuit MEM1 and the memory circuit MEM2 each include a capacitor and a transistor. The memory circuit MEM1 and the memory circuit MEM2 have a function of storing a signal supplied through the wiring DL as a charge (potential) in the capacitor. The memory circuit MEM1 and the memory circuit MEM2 have a function of storing a voltage obtained by adding a potential of a signal written later to a stored potential, which is achieved by supplying a different signal through the wiring DL. Specifically, the signals can be added by utilizing capacitive coupling, which is generated when one electrode of a capacitor is in an electrically floating state, and a signal is supplied to the other electrode of the capacitor. Note that in the memory circuit MEM1 and the memory circuit MEM2, storing a signal supplied through the wiring DL as a charge in the capacitor is also called storing a signal.

In this specification, a pixel expresses one element which can control brightness, for example. Therefore, as an example, one pixel expresses one color element, and brightness is expressed by the color element. Accordingly, in the case of a color liquid crystal display device made of color elements of R (Red), G (Green), and B (Blue), a minimum unit of an image is composed of three pixels consisting of an R pixel, a G pixel, and a B pixel. In this case, each of the RGB pixels is referred to as a subpixel, and the RGB pixels are collectively referred to as a pixel.

Figure 1B:
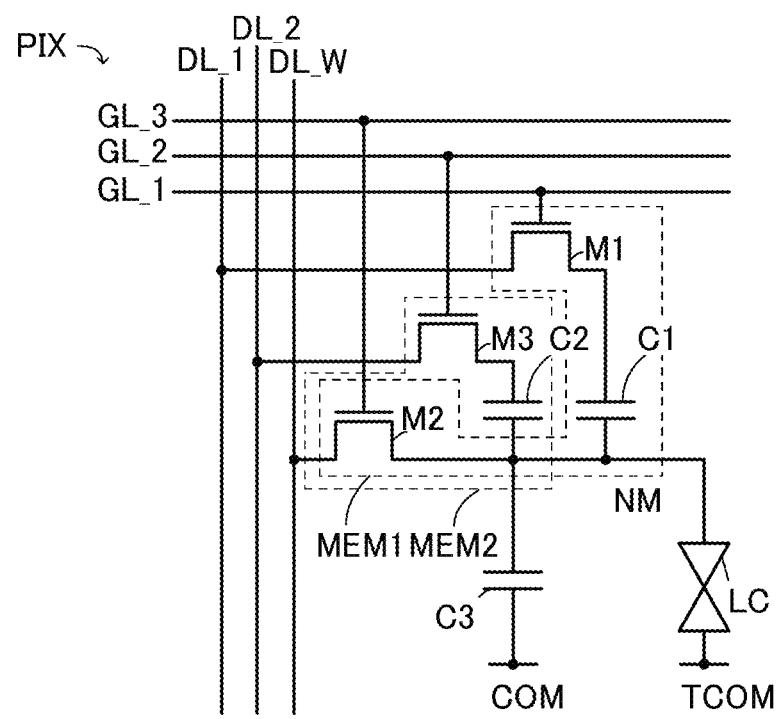

FIG. 1(B) illustrates a structure example of the pixel PIX. The pixel PIX includes a transistor M1, a transistor M2, a transistor M3, a capacitor C1, a capacitor C2, a capacitor C3, and a liquid crystal element LC. In FIG. 1(B), a node to which one electrode of the liquid crystal element LC, one electrode of the capacitor C1, one electrode of the capacitor C2, and one electrode of the capacitor C3 are connected is illustrated as a node NM. Although the transistors illustrated in FIG. 1(B) are n-channel transistors, p-channel transistors can also be used.

The transistors M1 to M3 function as switches. The memory circuit MEM1 includes the capacitor C1, the transistor M1, and the transistor M2. The memory circuit MEM2 includes the capacitor C2, the transistor M2, and the transistor M3.

In FIG. 1(B), a wiring GL_1, a wiring GL_2, and a wiring GL_3 are illustrated as the wirings GL shown in FIG. 1(A). The wiring GL_1, the wiring GL_2, and the wiring GL_3 have a function of transmitting signals for controlling on/off of the transistors functioning as switches to the pixel PIX.

In FIG. 1(B), a wiring DL_1, a wiring DL_2, and a wiring DL_W are illustrated as the wirings DL shown in FIG. 1(A). The wiring DL_1 and the wiring DL_2 have a function of transmitting signals for displaying an image and a reference voltage to the pixel PIX. The wiring DL_W has a function of transmitting a signal for displaying an image to the pixel PIX.

The capacitor C1 or the capacitor C2 has a function of storing a signal written to the memory circuit MEM1 or the memory circuit MEM2 as a charge. The memory circuit MEM or the memory circuit MEM2 has a function of writing a signal to an electrode of the capacitor C1 or the capacitor C2 by turning on the transistor M1, the transistor M2, and the transistor M3 which are electrically connected to one electrode or the other electrode of the capacitor C1 or the capacitor C2. Furthermore, the memory circuit MEM1 or the memory circuit MEM2 has a function of storing a charge in the electrode of the capacitor C1 or the capacitor C2 by turning off the transistor M1, the transistor M2, and the transistor M3. Moreover, the memory circuit MEM1 or the memory circuit MEM2 has a function of making a node of one electrode of the capacitor C1 or the capacitor C2 to be in an electrically floating state (floating) by turning off the transistor M1, the transistor M2, and the transistor M3.

As illustrated in FIG. 1(B), the other electrode of the capacitor C1 is connected to the wiring DL_1 through the transistor M1. The other electrode of the capacitor C1 is connected to the node NM, that is, one electrode of the liquid crystal element LC. The other electrode of the capacitor C1 is connected to the wiring DL_W through the transistor M2. One electrode of the capacitor C2 is connected to the wiring DL_2 through the transistor M3. The other electrode of the capacitor C2 is connected to the node NM, that is, one electrode of the liquid crystal element LC. The other electrode of the capacitor C2 is connected to the wiring DL_W through the transistor M2.

The transistor M1, the transistor M2, and the transistor M3 preferably have low current flowing when off (off-state current). Using a transistor with an extremely low off-state current allows the potential in the node NM to be retained for a long time. As the transistor, a transistor using a metal oxide in a channel formation region (hereinafter referred to as an OS transistor) can be used, for example. The metal oxide includes In, Zn, and M (M is Al, Ti, Ga, Sn, Y, Zr, La, Ce, Nd, or Hf). An OS transistor will be described in detail in an embodiment below. Note that a transistor in which silicon is used for its channel formation region (a Si transistor) can be also used as the transistor M1, the transistor M2, and the transistor M3. For the Si transistor, other than a transistor in which amorphous silicon is included in a semiconductor layer, a transistor in which a crystalline silicon such as low-temperature polysilicon is included in a semiconductor layer, a transistor in which single crystal silicon is included in a semiconductor layer, or the like can be used.

The capacitor C3 has a function of storing the potential of the node NM, that is, the potential of one electrode of the liquid crystal element LC. One electrode of the capacitor C3 is connected to the node NM, that is, one electrode of the liquid crystal element LC. The other electrode of the capacitor C3 is connected to a wiring COM which supplies a common potential Vcom. With this structure, a change in the potential of the node NM, that is, a change in the potential of the liquid crystal element LC can be inhibited in a signal-writing period. The other electrode of the liquid crystal element LC is connected to a wiring TCOM to which a potential for driving the liquid crystal element LC is supplied.

In one embodiment of the present invention, a signal for performing grayscale display that is output from the source driver 140 is supplied to a pixel and stored in a plurality of memory circuits, after which a signal for performing grayscale display different from the signal that is stored in the plurality of memory circuits is supplied from the source driver 140 to the pixel. In FIG. 1(B), the charge corresponding to the signal for performing grayscale display that is output from the source driver 140 is stored in each of the capacitors C1 and C2 included in the two memory circuits (the memory circuits MEM1 and MEM2). One electrode side of each of the capacitors C1 and C2 is in an electrically floating state, and the signal for performing grayscale display is supplied from the source driver 140 to the other electrode side of each of the capacitors C1 and C2 at the same time through the wiring DL_1 and the wiring DL_2. A voltage in one electrode side of each of the capacitors C1 and C2 is made of four signals added together by capacitive coupling; hence, the structure is such that the voltage is applied to the liquid crystal element.

With this structure, in memory circuits that have stored two signals in advance, two signals different from those already stored in the memory circuits are added; and on the basis of the four signals, the voltage to be applied to the liquid crystal element can be controlled. Therefore, the display portion including the pixel can perform display on the basis of the four signals. Accordingly, a structure where a signal of a number of bits that the source driver can output (for example, 8 bits: 256 grayscale) is stored in each of two memory circuits in a pixel in advance, after which two signals of a number of bits that the source driver can output (for example, 8 bits: 256 grayscale) are written in the pixel, can be achieved. Thus, a structure where display is performed by writing a signal corresponding to the total number of grayscale levels of the four signals which is 256+256+256+256=1024 grayscale levels (10 bits), that is, a number of grayscale levels that is greater than or equal to the number of grayscale levels corresponding to the number of bits that the source driver can output, can be achieved. With this structure, an image corresponding to an image signal having a potential higher than the potential that can be generated by the source driver and the like can be displayed on the liquid crystal display device. Accordingly, a high voltage that surpasses the voltage amplitude of a signal that can be input to a pixel can be applied, and a liquid display device using a liquid crystal element that can be controlled by high-voltage application can be obtained.

Figure 2:
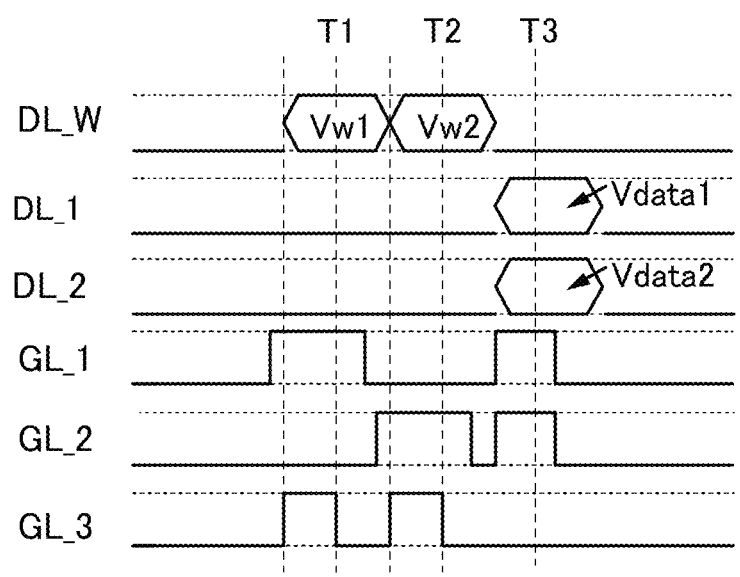
FIG. 2 A timing chart illustrating an operation example of a liquid crystal display device.

An example of a method for driving the pixel PIX in FIG. 1(B) is described using a timing chart illustrated in FIG. 2 and circuit diagrams illustrated in FIGS. 3(A) to 3(D). FIG. 2 illustrates a writing operation of signals that are stored in the memory circuit MEM1 and the memory circuit MEM2 and an operation for performing display by adding different signals to the signals stored in the memory circuit MEM1 and the memory circuit MEM2. Note that the timing chart shown in FIG. 2 illustrates waveforms of signals supplied to the wirings GL_1 to GL_3, DL_1, DL_2, and DL_W.

Note that signals supplied to the wiring DL_W are $W_1$ and $W_2$, a voltage stored in the memory circuit MEM1 due to the signal $W_1$ is referred to as Vw1, and a voltage stored in the memory circuit MEM2 due to the signal $W_2$ is referred to as Vw2. The signal written to the pixel PIX through the wiring DL_1 in a state where the voltage Vw1 is stored in the memory circuit MEM1 is referred to as data_1, and a voltage added to the memory circuit MEM1 due to the signal data_1 is referred to as Vdata1. The signal written to the pixel PIX through the wiring DL_2 in a state where the voltage Vw2 is stored in the memory circuit MEM2 is referred to as data_2, and a voltage added to the memory circuit MEM2 due to the signal data_2 is referred to as Vdata2. Note that although the reference voltage (Vr) supplied to the wirings DL_1 and DL_2 is described as L level (0 V), it can be set at another voltage.

First, writing operations of the signals $W_1$ and $W_2$ which are stored in the memory circuit MEM1 and the memory circuit MEM2 are described. The operation in FIG. 2 will be described with reference to the circuit diagrams in FIGS. 3(A) to 3(D) for simplification of the description.

Figure 3A:
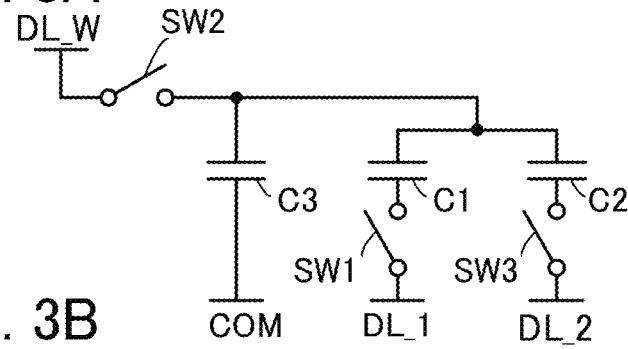
FIG. 3 Circuit diagrams illustrating structure examples of a liquid crystal display device.

The main portions of the circuit diagram in FIG. 1(B) are extracted and illustrated in FIGS. 3(A) to 3(D). In FIG. 3(A), switches SW1 to SW3, which are transistors functioning as switches, and the capacitors C1 to C3 are illustrated as components that correspond to those in FIG. 1(B). Note that the capacitance of the capacitors C1, C2, and C3 are illustrated as $C_1$, $C_2$, and $C_3$. The switches SW1 to SW3 correspond to the transistor M1, the transistor M2, and the transistor M3 in FIG. 1(B).

Figure 3B:
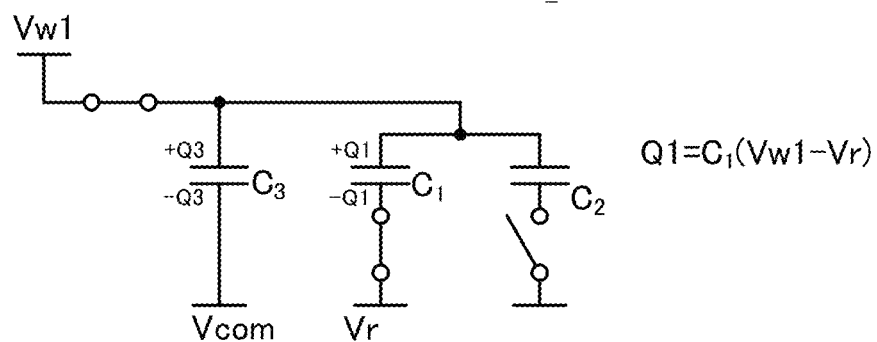

In the case where the voltages Vw1 and Vw2 based on the signals $W_1$ and $W_2$ are written in the memory circuit MEM1 and the memory circuit MEM2, first, the wiring DL_W is set at the voltage Vw1, and the wiring DL_1 is set at Vr (L level). The potential of the wiring DL_2 is not particularly determined. In a state where each wiring is set at a predetermined voltage, the signal supplied to each of the wiring GL_1 and the wiring GL_3 is set at H level, as in a time T1 in FIG. 2. That is, the switches SW1 and SW2 are turned on as illustrated in FIG. 3(B). Then, the voltages Vr and Vw1 are applied to the electrodes at both ends of the capacitor C1. At this time, when the amount of charge accumulated in the electrode of the capacitor C1 on the node NM side is Q1, Equation (1) is established.

$$Q1 = C_1(Vw1 - Vr) \qquad (1)$$

Figure 3C:
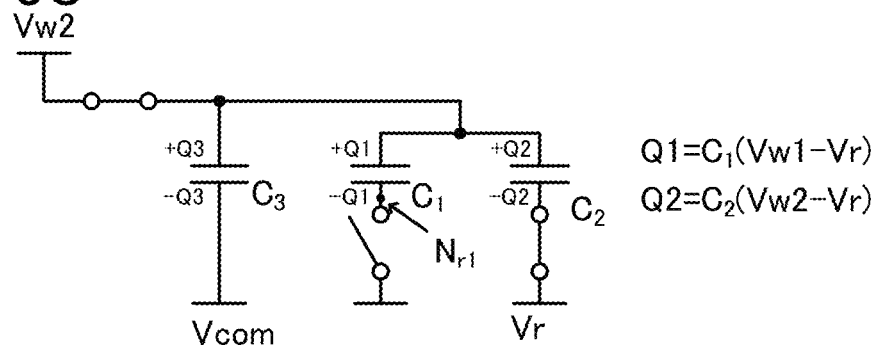

Next, the wiring DL_W is set at the voltage Vw2, and the wiring DL_2 is set at Vr. The potential of the wiring DL_1 is not particularly determined. Note that it is preferable that the value of Vr supplied to the wiring DL_2 be determined so that Vw2−Vr becomes a positive value. In a state where the potential of each wiring is set at a predetermined voltage, the signal supplied to the wiring GL_2 and the wiring GL_3 is set at H level, as in a time T2 in FIG. 2. That is, the switches SW2 and SW3 are turned on as illustrated in FIG. 3(C). Then, the voltages Vr and Vw2 are applied to the electrodes at both ends of the capacitor C2. At this time, when the amount of charge accumulated in the electrode of the capacitor C2 on the node NM side is Q2, Equation (2) is established.

$$Q2 = C_2(Vw2 - Vr) \qquad (2)$$

In the time T2, that is, the state in FIG. 3(C), the switch SW1 is in an off state. Therefore, a node of one electrode of the capacitor C1 (a node $N_{r1}$ in FIG. 3(C)) is in an electrically floating state, and the principle of charge conservation is established. Hence, in the time T2, that is, the state in FIG. 3(C), the amount of charge Q2 stored in the electrodes at both ends of the capacitor C2 is continually stored, similar to Equation (1).

Next, a writing operation of adding the signals data_1 and data_2 at the same time to the pixel PIX through the wirings DL_1 and DL_2 in a state where the voltage Vw1 and the voltage Vw2 based on the signals $W_1$ and $W_2$ are stored in the memory circuit MEM1 and the memory circuit MEM2 is described.

Figure 3D:
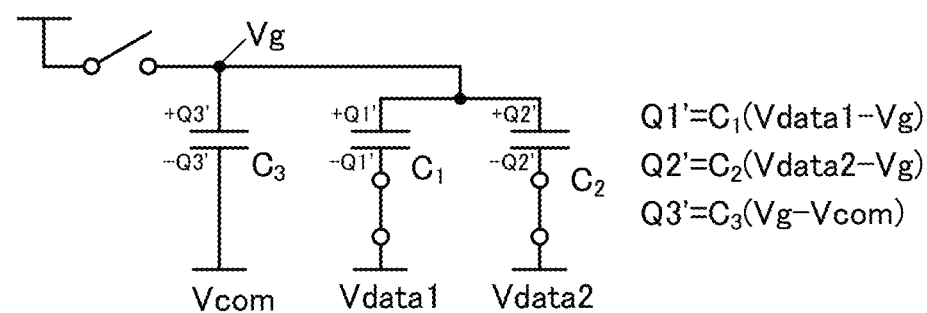

In the case where the signals data_1 and data_2 are written in the memory circuit MEM1 and the memory circuit MEM2, as in a time T3 in FIG. 2, in a state where the wiring DL_1 is set at Vdata1, the wiring DL_2 is set at Vdata2, and the wiring DL_W is set at L level, the signals supplied to the wirings GL_1 and GL_2 are set at H level, and the signal supplied to the wiring GL_3 is set at L level. That is, the switches SW1 and SW3 are turned on and the switch SW2 is turned off, as illustrated in FIG. 3(D). Accordingly, one electrode of each of the capacitors C1, C2, and C3 (that is, the node NM) is brought into an electrically floating state, and the voltage of the other electrode of each of the capacitors C1 and C2 changes to Vdata1 and Vdata2, respectively. When the voltage of the node NM is Vg and the amount of charge accumulated in the electrode of the capacitor C1 on the node NM side is Q1', Equation (3) is established. Vg is a voltage that changes by capacitive coupling.

$$Q1' = C_1(V\text{data1} - Vg) \quad (3)$$

In a similar manner, when the amount of charge accumulated in the electrodes on the node NM side of the capacitor C2 and the capacitor C3 are Q2' and Q3', Equations (4) and (5) are established.

$$Q2' = C_2(V\text{data2} - Vg) \quad (4)$$

$$Q3' = C_3(Vg - V\text{com}) \quad (5)$$

The writing of the signals $W_1$ and $W_2$ and the writing of the signals data_1 and data_2 in the times T1, T2, and T3 illustrated in FIG. 2 are operations that are performed in one horizontal scanning period. Thus, between the times T1, T2 and T3 in FIG. 2, the current that leaks from the node NM through the switches SW1 to SW3 is extremely low; hence, the principle of charge conservation is established. That is, Equation (6) is established.

$$Q1 + Q2 + Q3 = Q1' + Q2' + Q3' \quad (6)$$

Equation (7) is established when Equation (6) is solved for Vg. Note that for simplicity in Equation (7), the reference voltages Vr and Vcom with respect to the voltages Vw1, Vw2, Vdata1, and Vdata2 are each set at 0 V the capacitance $C_1$ is equal to the capacitance $C_2$, and the capacitance $C_3$ is set adequately smaller than each of the capacitances $C_1$ and $C_2$.

$$V_g = \frac{C_1(V_{W1} - V_r) + C_2(V_{W2} - V_r) + C_3(V_{W2} - V_{com}) + C_1 V_{data1} + C_2 V_{data2} + C_3 V_{com}}{C_1 + C_2 + C_3} = \frac{V_{W1} + V_{W2} + V_{data1} + V_{data2}}{2} \quad (7)$$

According to Equation (7), the voltage Vg can be obtained by adding together the voltage Vw1, the voltage Vw2, the voltage Vdata1, and the voltage Vdata2; therefore, addition of the signals stored in the memory circuits and signals written later can be performed. Note that when signals are written such that the voltage Vw1, the voltage Vw2, the voltage Vdata1, and the voltage Vdata2 have negative values, addition of signals as well as subtraction of signals can be performed.

The liquid crystal display device of one embodiment of the present invention can have a structure where a voltage for applying to a liquid crystal element is controlled on the basis of the four signals $W_1$, $W_2$, data_1 and data_2 which are obtained by storing two signals in the memory circuits MEM1 and MEM2 in advance and adding two signals different from those already stored in the memory circuits MEM1 and MEM2. Therefore, the display portion including the pixel can perform display on the basis of the four signals. Accordingly, a structure where a signal of a number of bits that the source driver can output (for example, 8 bits: 256 grayscale) is stored in each of two memory circuits in a pixel in advance, after which two signals of a number of bits that the source driver can output (for example, 8 bits: 256 grayscale) are written in the pixel, can be achieved. Thus, a structure where display is performed by writing a signal corresponding to the total number of grayscale levels of the four signals which is 256+256+256+256=1024 grayscale levels (10 bits), that is, a number of grayscale levels corresponding to greater than or equal to the number of bits that the source driver can output, can be achieved. With this structure, an image corresponding to an image signal having a potential higher than the potential that can be generated by the source driver and the like can be displayed by the liquid crystal display device. Accordingly, a high voltage that surpasses the voltage amplitude of a signal that can be input to a pixel can be applied, and a liquid display device using a liquid crystal element that is controllable by high-voltage application can be obtained.

Figure 4:
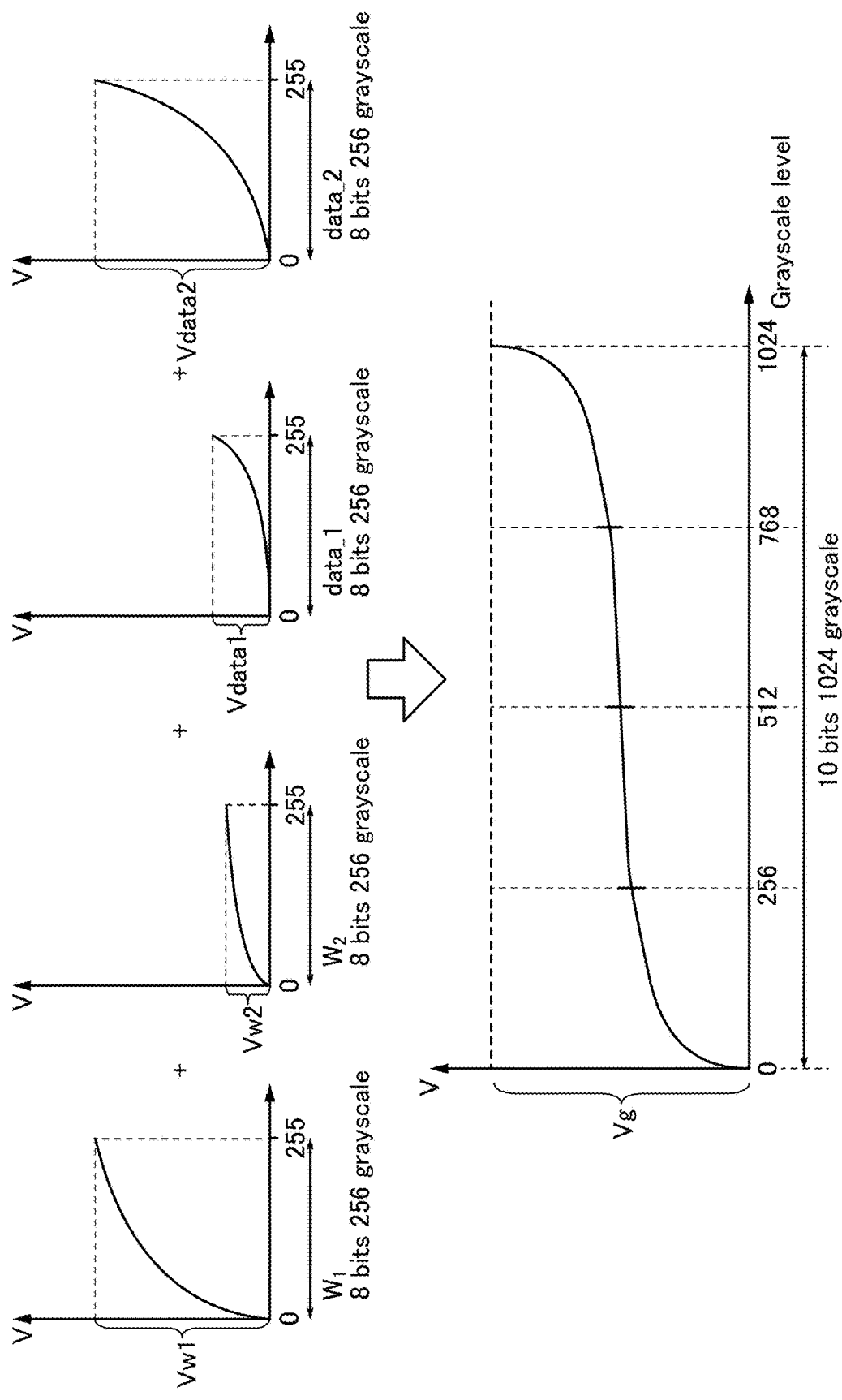
FIG. 4 Graphs illustrating an operation example of a liquid crystal display device.

The above-described effect of the liquid crystal display device of one embodiment of the present invention is described with reference to graphs shown in FIG. 4. In FIG. 4, four graphs in which the horizontal axis represents the number of grayscale levels and the vertical axis represents the voltage of the signals ($W_1$, $W_2$, data_1, and data_2), and a graph in which signals ($W_1$, $W_2$, data_1, and data_2) are added together are illustrated.

In the four graphs (upper side of FIG. 4) where the horizontal axis represents the number of grayscale levels and the vertical axis represents the voltage of the signals ($W_1$, $W_2$, data_1, and data_2), a plurality of signals that are output after adjusting the output voltage by a source driver that is capable of outputting 8-bit grayscale levels are illustrated. As illustrated in FIG. 4, each of the signals ($W_1$, $W_2$, data_1, and data_2) is output after making adjustments so that the curves expressing the relationship of the number of grayscale levels with respect to the output voltage are each different.

In the graph (lower side of FIG. 4) where the signals ($W_1$, $W_2$, data_1, and data_2) are added together, 0 to 256 grayscale levels and 256 to 512 grayscale levels represent the curves of $W_1$ and $W_2$, respectively, and 512 to 768 grayscale levels and 768 to 1024 grayscale levels represent the curves of data_1 and data_2, respectively. The curves can express the relationship of the number of grayscale levels with respect to the output voltage. Thus, the curves of voltage corresponding to the number of grayscale levels can be applied to characteristics with respect to the voltage of the liquid crystal element.

In addition, in the above Equation (7), when the reference voltage Vr is increased to be equal to the signals ($W_1$, $W_2$, data_1, and data_2), Equation (8) is established.

$$V_g = \frac{C_1(V_{W1} - V_r) + C_2(V_{W2} - V_r) + C_3(V_{W2} - V_{com}) + C_1 V_{data1} + C_2 V_{data2} + C_3 V_{com}}{C_1 + C_2 + C_3} = \frac{V_{W1} + V_{W2} + V_{data1} + V_{data2}}{2} - 2V_r \quad (8)$$

Figure 5:
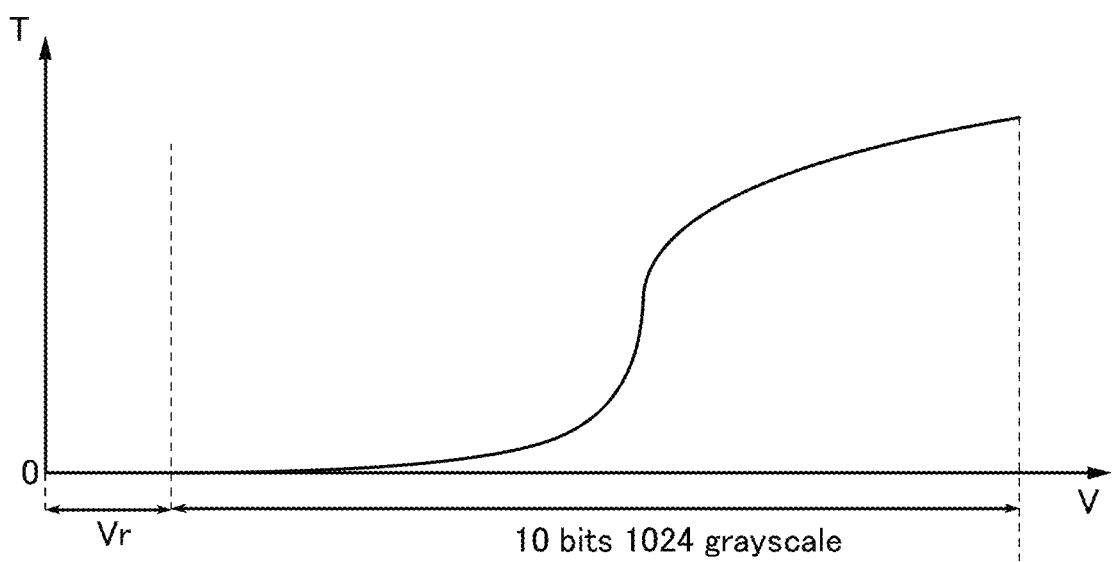
FIG. 5 A graph illustrating an operation example of a liquid crystal display device.

When the reference voltage Vr shown in Equation (8) is adjusted, the voltage applied to the liquid crystal element can be shifted to the high-voltage side (including the low-voltage side when inversion driving is considered). FIG. 5 is a graph in which the horizontal axis represents voltage and the vertical axis represents the transmittance of the liquid crystal element. When the reference voltage Vr in Equation (8) is made larger, the correspondence of transmittance to voltage can be shifted to the high-voltage side. Therefore, the voltage intervals corresponding to the grayscale value on the low-voltage side which exhibits small optical changes can be shifted to the high-voltage side, and performing driving of a liquid crystal element requiring high voltage becomes possible using a driver IC that outputs low voltage.

As described above, with the structure of one embodiment of the present invention, the voltage applied to the liquid crystal element can be controlled on the basis of at most four signals. For example, in the case where the signal $W_1$ is written as 8 bits, which is the number of bits that the source driver can output, only 256 grayscale levels can be expressed with the signal $W_1$ alone; however, when the expressible number of grayscale levels is increased by combining with signals $W_2$, data_1 and data_2, which are 8-bit signals that the source driver can output, a maximum of 1024 grayscale levels, that is, a number of bits corresponding to 10 bits can be expressed.

Figure 6A:
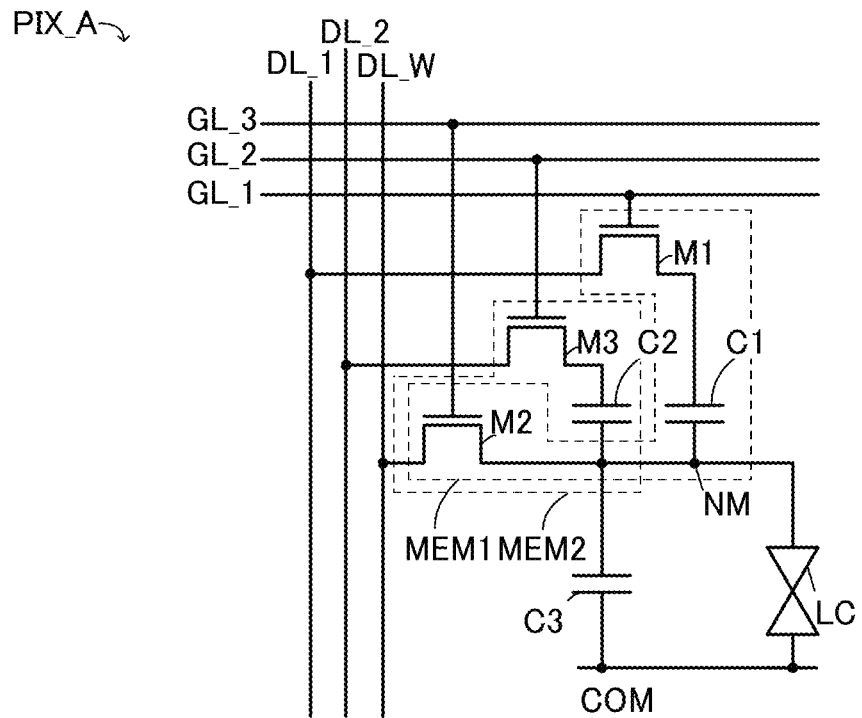
FIG. 6 Circuit diagrams illustrating structure examples of a liquid crystal display device.

Next, a modification example of the pixel PIX is described. The pixel PIX can have a structure of a pixel PIX_A illustrated in FIG. 6(A). The pixel PIX_A has a structure in which the wiring COM and the wiring TCOM in the pixel PIX are illustrated as a common wiring.

Figure 6B:
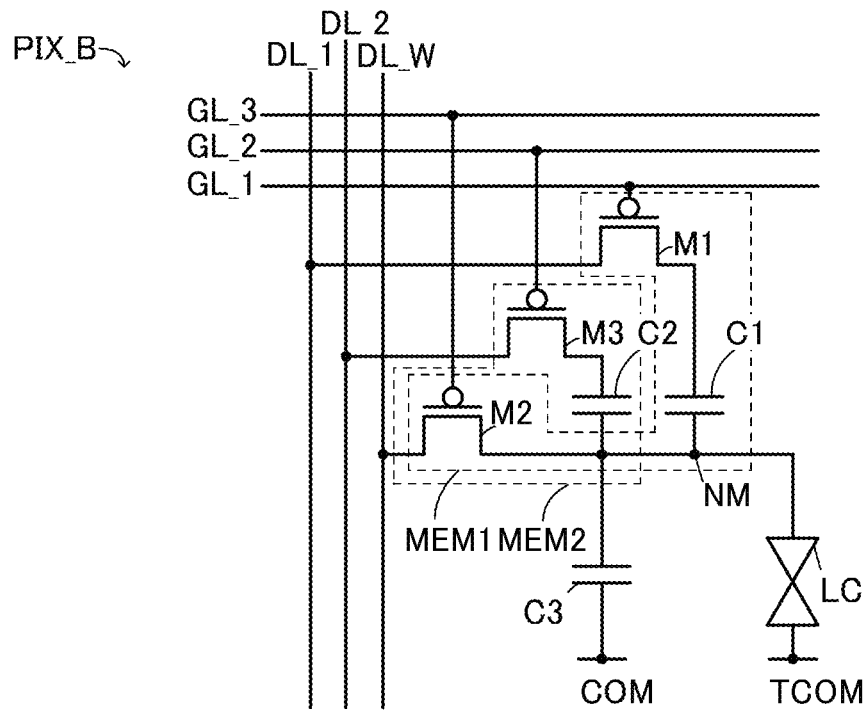

The pixel PIX can also have a structure of a pixel PIX_B illustrated in FIG. 6(B). The pixel PIX_B has a structure in which transistors that are illustrated as n-channel transistors in the pixel PIX are p-channel transistors. Note that in the case where the structure in FIG. 6(B) is employed, an operation similar to that in FIG. 2 can be achieved by inversion of the logic of the signals supplied to the wirings below.

Figure 7A:
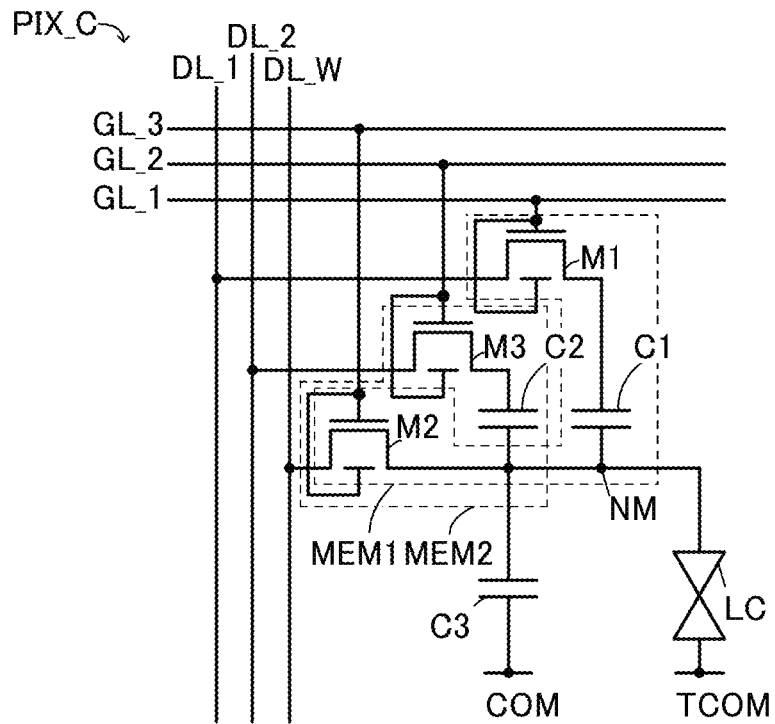
FIG. 7 Circuit diagrams illustrating structure examples of a liquid crystal display device.

The pixel PIX can have a structure of a pixel PIX_C illustrated in FIG. 7(A). The pixel PIX_C has a structure in which each transistor is configured with a back gate. The back gate is electrically connected to a front gate and can increase the on-state current. The structure may be such that different constant potentials can be supplied to the back gate and the front gate. In such a structure, the threshold voltage of the transistor can be controlled. Although all of the transistors have a back gate in the structure illustrated in FIG. 7(A), a transistor without a back gate may also be included. A structure in which a transistor with a back gate is included can also be used effectively in another pixel circuit in this embodiment.

Figure 7B:
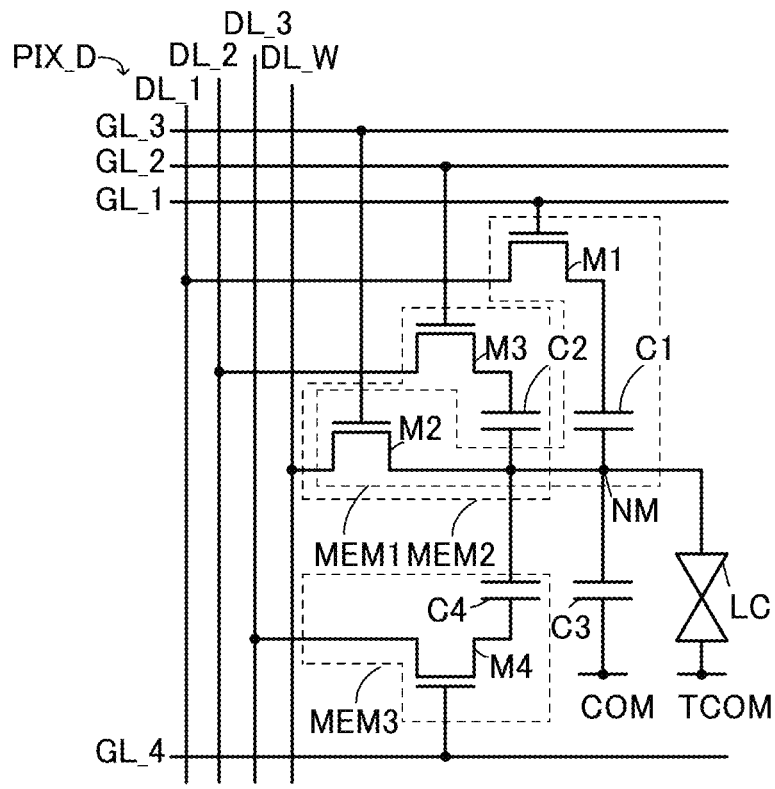

The pixel PIX can have a structure of a pixel PIX_D illustrated in FIG. 7(B). The circuit shown in the pixel PIX_D has a structure in which a transistor M4 and a capacitor C4 that function as a memory circuit MEM3 are added. In the memory circuit MEM3 which is added, the on state or off state of the transistor M4 that functions as a switch is controlled by a signal supplied to a wiring GL_4. In addition, in the memory circuit MEM3 which is added, a signal is supplied to the pixel PIX_D through a wiring DL_3. By adding a memory circuit as in FIG. 7(B), a liquid crystal display device with a pixel that includes three or more memory circuits can be achieved.

Figure 8:
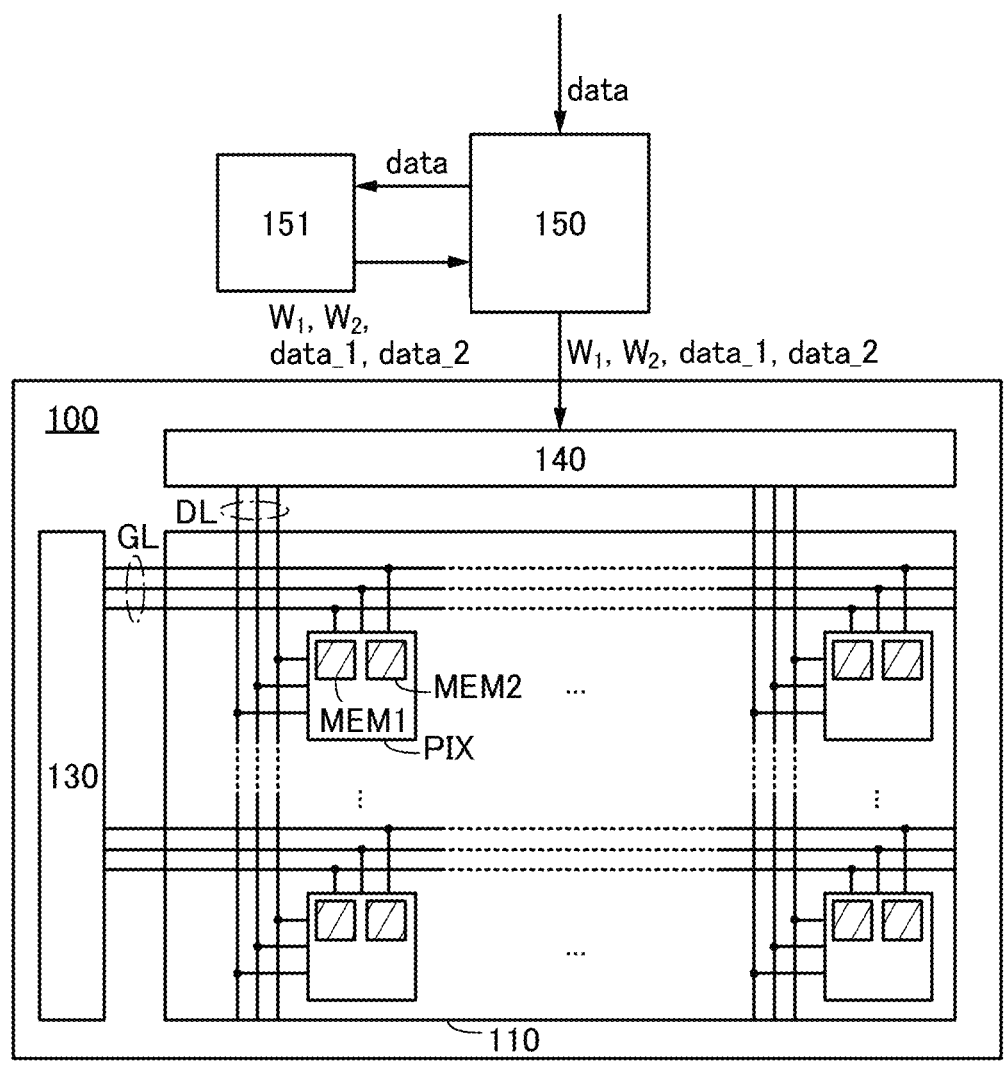
FIG. 8 A block diagram illustrating a structure example of a liquid crystal display device.

FIG. 8 illustrates a signal conversion circuit 150 and a memory circuit 151 in addition to the structure of the block diagram illustrated in FIG. 1(A).

In the case where a plurality of signals are added together in the liquid crystal display device 100, a structure in which signals $W_1$ and $W_2$ that are to be stored in the memory circuits MEM1 and MEM2 in the pixel PIX are output to the liquid crystal display device 100 after the original signal data (for example, a 10-bit signal) is converted into a plurality of signals $W_1$, $W_2$, data_1 and data_2 (for example, each signal is an 8-bit signal) by referring to the memory circuit 151 using the memory conversion circuit 150 is preferable.

This embodiment can be implemented in combination with any of the structures described in the other embodiments and the like as appropriate.

Embodiment 2

In this embodiment, a structure of a liquid crystal display device of one embodiment of the present invention that performs an operation different from the structure that is described in Embodiment 1 will be described with reference to drawings.

The structure of the liquid crystal display device described in this embodiment is similar to that of FIG. 1(A) described in Embodiment 1. Similarly, the same applies to the structure example of the pixel PIX illustrated in FIG. 1(B).

In one embodiment of the present invention described in this embodiment, charges corresponding to a positive data signal and a negative data signal that are output from the source driver 140 to perform inversion driving are stored in each of the capacitors C1 and C2 included in the two memory circuits (the memory circuits MEM1 and MEM2) in the pixel PIX. In the first period, the other electrode side of the capacitor C2, one electrode side of the capacitor C1, and one electrode side of the capacitor C2 are in an electrically floating state, and a signal for performing grayscale display using any one of the positive data signal or the negative data signal is supplied to the other electrode side of the capacitor C1 from the signal driver 140 through the wiring DL_1. In the second period, the other electrode side of the capacitor C1, one electrode side of the capacitor C1, and one electrode side of the capacitor C2 are in an electrically floating state, and a signal for performing grayscale display using any one of the positive data signal or the negative data signal is supplied to the other electrode side of the capacitor C2 from the source driver 140 through the wiring DL_2. When the first period and the second period operate alternately, voltages based on the positive data signal or the negative data signal are applied alternately to one electrode side of the capacitor C1 and one electrode side of the capacitor C2 due to capacitive coupling.

With this structure, by storing two signals of a positive data signal and a negative data signal in the memory circuits in advance and alternately supplying two signals different from those already stored in the memory circuits, a structure in which a positive voltage and a negative voltage are supplied to the liquid crystal element can be achieved. Hence, even in a state where data is stored in the pixel, inversion driving can be performed. As a result, by storing a data signal of a still image as two signals of a positive data signal and a negative data signal in the memory circuits, and alternately supplying two signals different from those already stored in the memory circuits, inversion driving of the liquid crystal element can be achieved without updating the data signals that are written in the pixel. Alternatively, with this structure, by storing two signals of a positive data signal and a negative data signal in the memory circuits in advance and alternately supplying two signals different from those already stored in the memory circuits, a structure where a positive voltage and a negative voltage are supplied to the liquid crystal element can be achieved; in addition, display of data signals that have been stored overlapping with data signals that are supplied later can be performed.

Note that the data signal supplied later may be a data signal for displaying a still image or a data signal for displaying a moving image.

Figure 9:
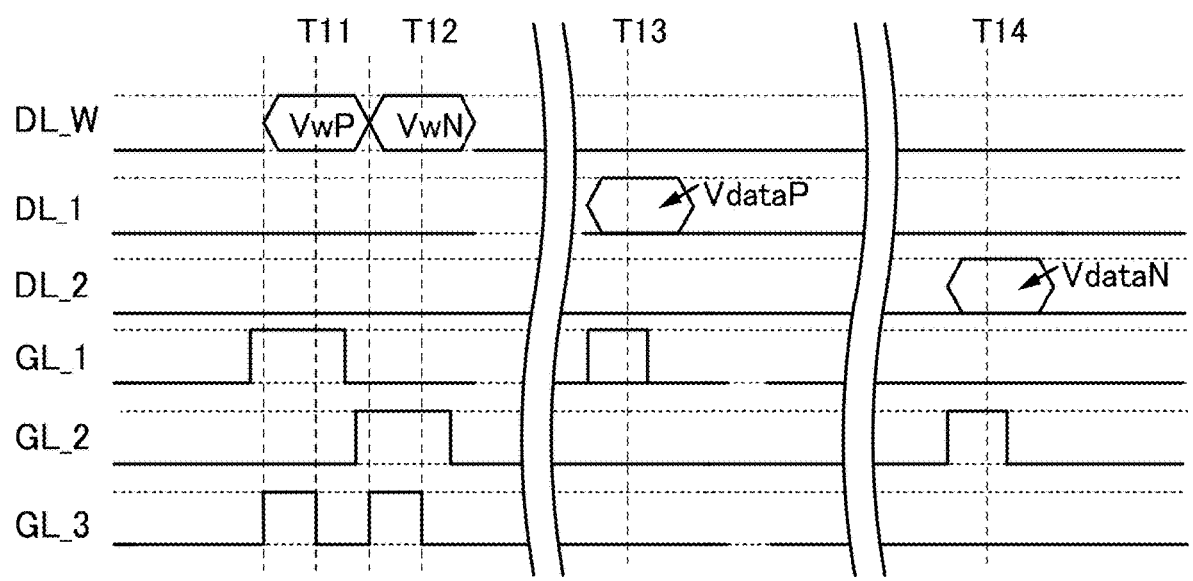
FIG. 9 A timing chart illustrating an operation example of a liquid crystal display device.
Figure 10A:
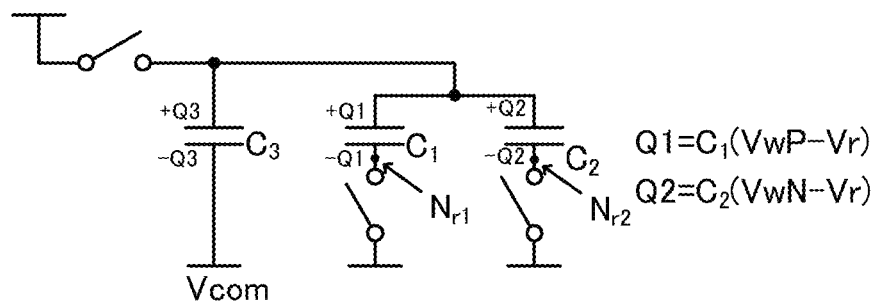
FIG. 10 Circuit diagrams illustrating structure examples of a liquid crystal display device.
Figure 10B:
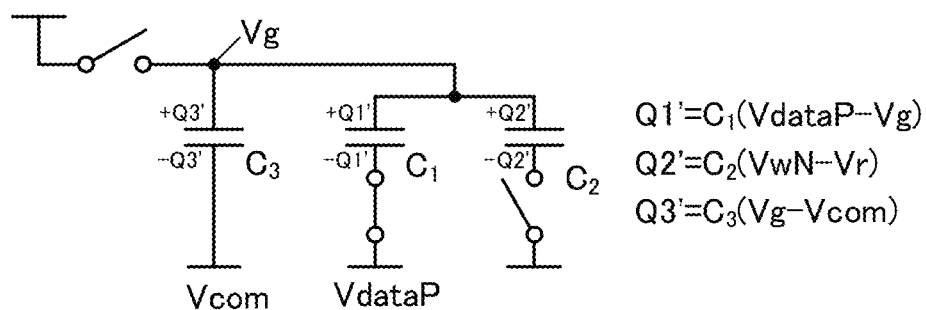
Figure 10C:
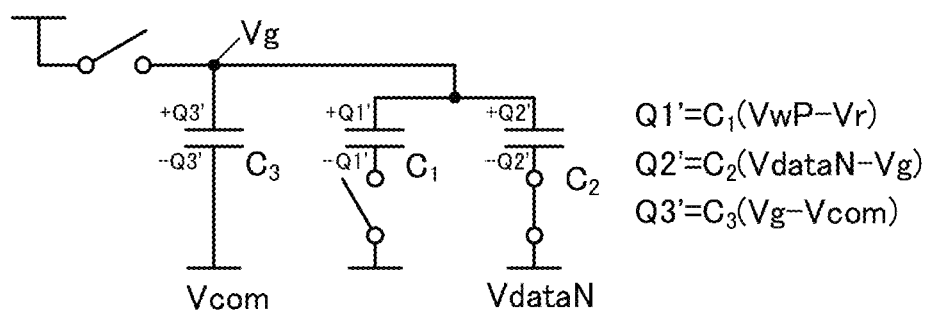

An example of a method for driving the pixel PIX in FIG. 1(B) is described using the timing chart illustrated in FIG. 9 and the circuit diagrams illustrated in FIGS. 10(A) to 10(C). FIG. 9 illustrates the write operation of signals to be stored in the memory circuit MEM1 and the memory circuit MEM2, and the operation for performing display by addition of different signals to the signals that have been stored in the memory circuit MEM1 and the memory circuit MEM2. Note that in the timing chart illustrated in FIG. 9, the waveforms of signals supplied to the wirings GL_1 to GL_3 DL_1, DL_2, and DL_W are illustrated.

The signals that are supplied to the wiring DL_W are $W_1$ and $W_2$, a voltage that is stored in the memory circuit MEM1 due to the signal $W_1$ is VwP, and a voltage that is stored in the memory circuit MEM2 due to the signal $W_2$ is VwN. The signal that is written to the pixel PIX through the wiring DL_1 in a state where the voltage VwP is stored in the memory circuit MEM1 is data_1, and a voltage that is added to the memory circuit MEM1 due to the signal data_1 is VdataP. The signal that is written to the pixel PIX through the wiring DL_2 in a state where the voltage VwN is stored in the memory circuit MEM2 is data_2, and a voltage that is added to the memory circuit MEM2 due to the signal data_2 is VdataN. Although the reference voltage (Vr) supplied to the wirings DL_1 and DL_2 are described as L level (0 V), it can be set at another voltage.

Note that the signals $W_1$ and $W_2$ in this embodiment correspond to a positive data signal and a negative data signal for displaying the same image. Thus, the voltages VwP and VwN are voltages that have a polarity different from the common potential Vcom. The signals data_1 and data_2 in this embodiment correspond to a positive data signal and a negative data signal for supplying a fixed potential or displaying the same image. Thus, the voltages VdataP and VdataN are voltages that have a polarity different from the common potential Vcom.

First, the writing operation of the signals $W_1$ and $W_2$ which are stored in the memory circuit MEM1 and the memory circuit MEM2 is described. The operation in FIG. 9 will be described with reference to the circuit diagrams in FIGS. 10(A) to 10(C) for simplification of the description. As in FIG. 3(A), the main portions of the circuit diagram in FIG. 1(B) are extracted and illustrated in the circuit diagrams of FIGS. 10(A) to 10(C).

In the case where the voltages VwP and VwN based on the signals $W_1$ and $W_2$ are written in the memory circuit MEM1 and the memory circuit MEM2, the wiring DL_W is set at the voltage VwP and the wiring DL_1 is set at Vr (L level). In this state, as in a time T11 in FIG. 9, the signal supplied to the wiring GL_1 and the wiring GL_3 is set at H level. Next, as in a time T12 in FIG. 9, the wiring DL_W is set at the voltage VwN, and the wiring DL_2 is set at Vr. In this state, as in the time T12 in FIG. 9, the signal supplied to the wiring GL_2 and the wiring GL_3 is set at H level.

After the above operation, the voltages Vr and VwP are stored in the electrodes at both ends of the capacitor C1, and the voltages Vr and VwN are stored in the electrodes at both ends of the capacitor C2. At this time, when the amount of the charge accumulated in the electrode of the capacitor C1 on the node NM side is Q1, Equation (9) is established. Similarly, when the amount of charge accumulated in the electrode of the capacitor C2 on the node NM side is represented by Q2, Equation (10) is established.

$$Q1 = C_1(VwP - Vr) \quad (9)$$

$$Q2 = C_2(VwN - Vr) \quad (10)$$

As illustrated in FIG. 10(A), since the node of one electrode of each of the capacitors C1 and C2 (the node $N_{r1}$ and a node $N_{r2}$ in FIG. 10(A)) is in an electrically floating state, the principle of charge conservation is established for the charge Q1 and Q2 shown in Equation (9) and Equation (10). Therefore, the electric charge Q1 and Q2 stored in the electrodes of both ends of the capacitors C1 and C2 continue to be stored after the time T12.

Next, an operation of adding the signal data_1 to the pixel PIX through the wirings DL_1 in a state where the voltage VwP and the voltage VwN based on the signals $W_1$ and $W_2$ are stored in the memory circuit MEM1 and the memory circuit MEM2 is described.

When writing the signal data_1 to the memory circuit MEM1, as in a time T13 in FIG. 9, in a state where the wiring DL_1 is set at the voltage VdataP, the signal supplied to the wiring GL_1 is H level, and the signals supplied to the wirings GL_2 and GL_3 are L level. The switch SW is turned on and the switches SW2 and SW3 are turned off, as illustrated in FIG. 10(B). Then, one electrode of each of the capacitors C1, C2, and C3 (that is, the node NM) is brought into an electrically floating state, and the voltage of the other electrode of the capacitor C1 changes to VdataP. When the voltage of the node NM is Vg and the amount of charge accumulated in the electrode of the capacitor C1 on the node NM side is Q1', Equation (11) is established. Vg is a voltage that changes by capacitive coupling.

$$Q1' = C_1(VdataP - Vg) \quad (11)$$

In a similar manner, when the amount of charge accumulated in the electrodes on the node NM side of the capacitor C2 and the capacitor C3 are Q2' and Q3', Equations (12) and (13) are established.

$$Q2' = C_2(VwN - Vr) \quad (12)$$

$$Q3' = C_3(Vg - Vcom) \quad (13)$$

Between the times T11, T12 and T13 in FIG. 9, the current that leaks from the node NM through the switches SW1 to SW3 is extremely low; hence, the principle of charge conservation is established. That is, Equation (14) is established.

$$Q1 + Q2 + Q3 = Q1' + Q2' + Q3' \quad (14)$$

Equation (15) is established when Equation (14) is solved for Vg. Note that for simplicity in Equation (15), the reference voltages Vr and Vcom with respect to the voltages VdataP, VwP, and VwN are each set at 0 V, the capacitance $C_1$ is equal to the capacitance $C_2$, and the capacitance $C_3$ is set adequately smaller than each of the capacitances $C_1$ and $C_2$.

$$Vg = VwP + VdataP \quad (15)$$

From Equation (15), a value of Vg corresponding to the voltage VwP and the voltage VdataP can be obtained. Note that when the capacitance $C_1$ is made larger than capacitance $C_3$, the capacitor C1 can continue storing the voltage VwP (=VwP−Vr) even after charge distribution due to switching of the switches SW1 to SW3 occurs.

Similarly, when writing the signal data_2 to the memory circuit MEM1, as in a time T14 in FIG. 9, in a state where the wiring DL_2 is set at the voltage VdataN, the signal supplied to the wiring GL_2 is H level, and the signals supplied to the wirings GL_1 and GL_3 are L level. That is, the switch SW3 is turned on and the switches SW1 and SW2 are turned off, as illustrated in FIG. 10(C). Then, one electrode of each of the capacitors C1, C2, and C3 (that is, the node NM) is brought into an electrically floating state, and the voltage of the other electrode of the capacitor C2 changes to VdataN. When the voltage of the node NM is Vg and the amount of charge accumulated in the electrode of the capacitor C2 on the node NM side is Q2', Equation (16) is established. Vg is a voltage that changes by capacitive coupling.

$$Q2'=C_2(VdataN-Vg) \qquad (16)$$

In a similar manner, when the amount of charge accumulated in the electrodes on the node NM side of the capacitor C1 and the capacitor C3 are Q1' and Q3', Equations (17) and (18) are established. Note that during the operation of supplying the voltage VdataN, electrodes at both ends of the capacitor C1 are in an electrically floating state; hence, voltage VwP (=VwN−Vr) continues to be stored.

$$Q1'=C_1(VwP-Vr) \qquad (17)$$

$$Q3'=C_3(Vg-Vcom) \qquad (18)$$

Between the times T11, T12 and T13 in FIG. 9, the current that leaks from the node NM through the switches SW1 to SW3 is extremely low; hence, the principle of charge conservation is established. That is, Equation (19) is established.

$$Q1+Q2+Q3=Q1'+Q2'+Q3' \qquad (19)$$

Equation (20) is established when Equation (19) is solved for Vg. Note that for simplicity in Equation (20), the reference voltages Vr and Vcom with respect to the voltages VdataN, VwP, and VwN are each set at 0 V, the capacitance $C_1$ is equal to the capacitance $C_2$, and the capacitance $C_3$ is set adequately smaller than each of the capacitances $C_1$ and $C_2$.

$$Vg=VwN+VdataN \qquad (20)$$

From Equation (20), a value of Vg corresponding to the voltages VwN and VdataN can be obtained. Note that when the capacitance $C_2$ is made larger than capacitance $C_3$, the capacitor C2 can continue storing the voltage VwN (=VwN−Vr) even after charge distribution due to switching of the switches SW1 to SW3 occurs. In doing so, inversion driving can be performed without updating the signals $W_1$ and $W_2$.

From the Equations (15) and (20), a structure that enables inversion driving while displaying an image with the same grayscale can be obtained by supplying the signal data_1 and the signal data_2 alternately. In the period of inversion driving, the data signals do not need to be written to the memory circuits again while continuously displaying the same image; hence, the power consumption of the peripheral circuit can be reduced. Note that when writing the data_1 and the data_2, a structure in which image data is supplied to display moving images or still images can be employed. In that case, an image that is written later overlapping with an image that is stored can be displayed. An image that is written later can be a data signal for displaying a moving image as well as a still image. By making the data signal that is to overlap be a moving image, an overlap of a still image and a moving image can be achieved.

By displaying a stored image as described in FIGS. 10(A) to 10(C) and displaying an image that is written later and overlaps the stored image, displaying as illustrated in FIG. 11 can be performed.

Figure 11A:
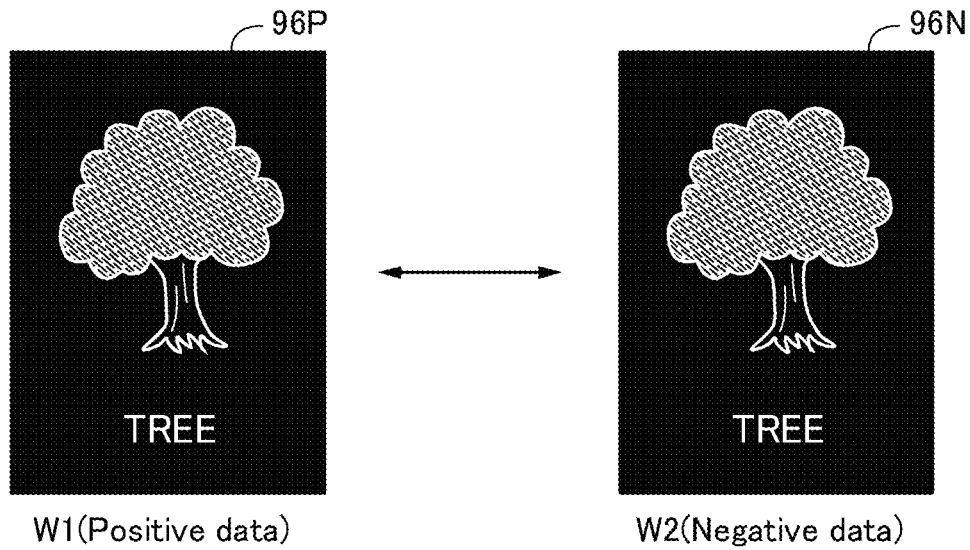
FIG. 11 Schematic diagrams illustrating operation examples of a liquid crystal display device.

FIG. 11(A) illustrates an example in which a signal $W_1$ (positive data) and a signal $W_2$ (negative data) are each stored in memory circuits, and an image 96P and an image 96N are alternately switched with the above driving method. With this structure, inversion driving can be performed using the data signals temporarily stored in the memory circuits while displaying a still image.

Figure 11B:
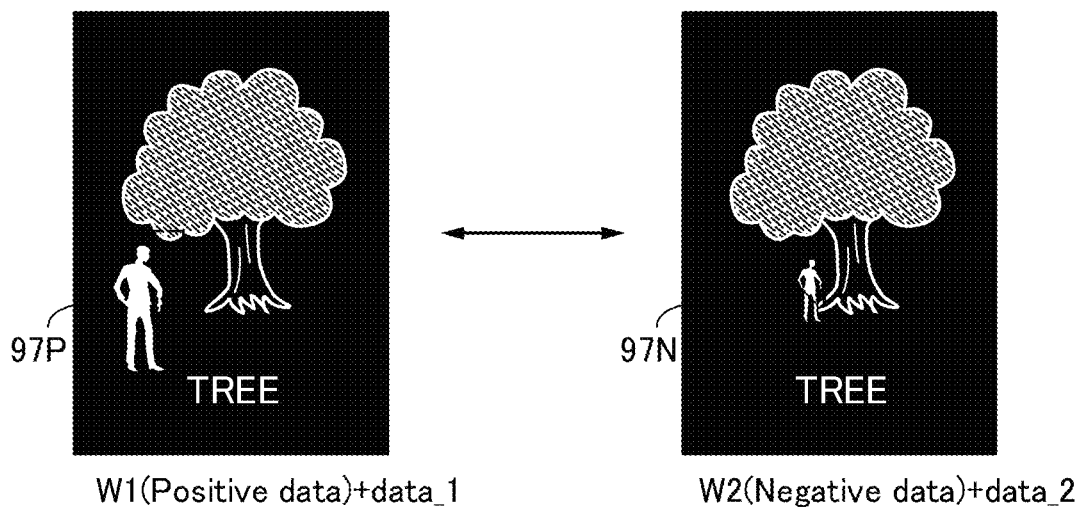

FIG. 11(B) illustrates an example in which the signal W1 (positive data) and the signal $W_2$ (negative data) are each stored in memory circuits, and by the above driving method, images (persons 97P and 97N surrounded by dashed lines) added together by data signals (data_1 and data_2) different from the stored signals are displayed while performing inversion driving. With this structure, inversion driving can be performed using the data signals temporarily stored in the memory circuits while displaying an image in which a still image and a moving image are added together.

Figure 11C:
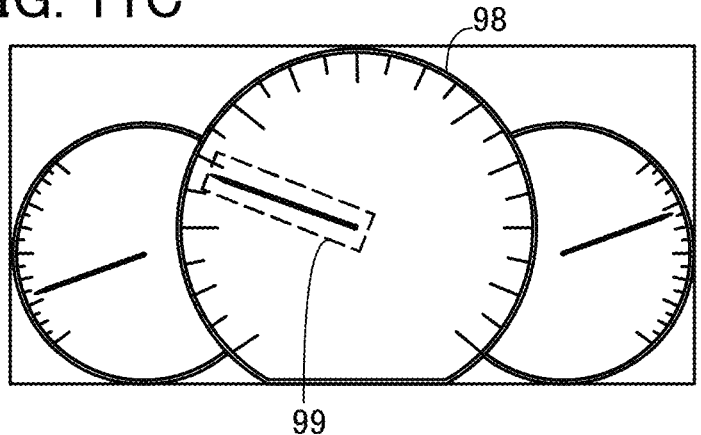

FIG. 11(C) illustrates a schematic diagram of a speedometer as an example of an image in which displaying by adding together a still image and a moving image is effective. As illustrated in FIG. 11(C), by displaying a scale portion 98 of the speedometer as a still image and displaying a needle portion 99 of the speedometer as a moving image, the frequency of updating the data signal can be reduced.

This embodiment can be implemented in combination with any of the structures described in the other embodiments and the like as appropriate.

Embodiment 3

In this embodiment, details of the OS transistor described in Embodiment 1 is described.

As a semiconductor material used for the OS transistor, a metal oxide that has an energy gap greater than or equal to 2 eV, preferably greater than or equal to 2.5 eV, more preferably greater than or equal to 3 eV can be used. A typical example is an oxide semiconductor or the like containing indium, and a CAAC-OS or a CAC-OS described later can be used, for example. A CAAC-OS has a crystal structure including stable atoms and is suitable for a transistor and the like that values reliability. A CAC-OS has high mobility and is suitable for a transistor and the like that operates at high speed.

An OS transistor has a large energy gap and thus has an extremely low off-state current. An OS transistor has the following feature that is different from that of a Si transistor: impact ionization, an avalanche breakdown, a short-channel effect, or the like does not occur and thus can configure a highly reliable circuit.

A semiconductor layer included in the OS transistor can be, for example, a film represented by an In-M-Zn-based oxide that contains indium, zinc, and M (a metal such as aluminum, titanium, gallium, germanium, yttrium, zirconium, lanthanum, cerium, tin, neodymium, or hafnium).

In the case where the oxide semiconductor forming the semiconductor layer is an In-M-Zn-based oxide, it is preferable that the atomic ratio of metal elements of a sputtering target used to form a film of the In-M-Zn-based oxide satisfy In M and Zn M. The atomic ratio of metal elements in such a sputtering target is preferably, for example, In:M:Zn=1:1:1, In:M:Zn=1:1:1.2, In:M:Zn=3:1:2, In:M:Zn=4:2:3, In:M:Zn=4:2:4.1, In:M:Zn=5:1:6, In:M:Zn=5:1:7, or In:M:Zn=5:1:8. Note that the atomic ratio of the semiconductor layer to be formed includes variation from the above atomic ratio of metal elements of the sputtering target in a range of ±40%.

An oxide semiconductor with low carrier concentration is used for the semiconductor layer. For example, an oxide semiconductor which has a carrier concentration lower than or equal to $1\times10^7/cm^3$, preferably lower than or equal to $1\times10^{15}/cm^3$, further preferably lower than or equal to $1\times10^{13}/cm^3$, still further preferably lower than or equal to $1\times10^{11}/cm^3$, yet further preferably lower than $1\times10^{10}/cm^3$, and higher than or equal to $1\times10^{-9}/cm^3$ can be used for the semiconductor layer. Such an oxide semiconductor is referred to as a highly purified intrinsic or substantially highly purified intrinsic oxide semiconductor. The oxide semiconductor has a low density of defect states and thus can be regarded as an oxide semiconductor having stable characteristics.

Note that without limiting to the above, a material with an appropriate composition can be used in accordance with required semiconductor characteristics and electrical characteristics (for example, field-effect mobility, threshold voltage, and the like) of a transistor. To obtain the required semiconductor characteristics of the transistor, it is preferable that the carrier concentration, the impurity concentration, the density of defect states, the atomic ratio between a metal element and oxygen, the interatomic distance, the density, and the like of the semiconductor layer be set at appropriate values.

When silicon or carbon, which is an element belonging to Group 14, is included in the oxide semiconductor forming the semiconductor layer, the amount of oxygen vacancies is increased in the semiconductor layer, and the semiconductor layer becomes n-type. Thus, the concentration of silicon or carbon (measured by secondary ion mass spectrometry) in the semiconductor layer is set at lower than or equal to $2\times10^{18}$ atoms/$cm^3$, preferably lower than or equal to $2\times10^{17}$ atoms/$cm^3$.

Alkali metal and alkaline earth metal sometimes generate carriers when bonded with an oxide semiconductor, in which case the off-state current of the transistor might be increased. Thus, the concentration of alkali metal or alkaline earth metal (concentration obtained by secondary ion mass spectrometry) in the semiconductor layer is set at lower than or equal to $1\times10^{18}$ atoms/$cm^3$, preferably lower than or equal to $2\times10^{16}$ atoms/$cm^3$.

When nitrogen is included in the oxide semiconductor forming the semiconductor layer, electrons serving as carriers are generated and the carrier concentration increases, and the semiconductor layer easily becomes n-type. As a result, a transistor using an oxide semiconductor that contains nitrogen is likely to become normally on. Hence, the concentration of nitrogen in the semiconductor layer (concentration obtained by secondary ion mass spectrometry) is preferably set at lower than or equal to $5\times10^{18}$ atoms/$cm^3$.

The semiconductor layer may have a non-single-crystal structure, for example. The non-single-crystal structure includes a CAAC-OS (C-Axis Aligned Crystalline Oxide Semiconductor) including a c-axis aligned crystal; a polycrystalline structure; a microcrystalline structure; or an amorphous structure, for example. Among the non-single-crystal structures, an amorphous structure has the highest density of defect states, whereas CAAC-OS has the lowest density of defect states.

An oxide semiconductor film having an amorphous structure has disordered atomic arrangement and no crystalline component, for example. Alternatively, an oxide film having an amorphous structure has a completely amorphous structure and no crystal portion, for example.

Note that the semiconductor layer may be a mixed film including two or more of a region having an amorphous structure, a region having a microcrystalline structure, a region having a polycrystalline structure, a region of CAAC-OS, and a region having a single crystal structure. The mixed film has, for example, a single-layer structure or a stacked-layer structure including two or more of the above regions in some cases.

Described below is the composition of a CAC (Cloud-Aligned Composite)-OS, which is one embodiment of a non-single-crystal semiconductor layer.

The CAC-OS is, for example, a composition of a material in which elements included in an oxide semiconductor are unevenly distributed at a size of greater than or equal to 0.5 nm and less than or equal to 10 nm, preferably greater than or equal to 1 nm and less than or equal to 2 nm, or a similar size. Note that in the following description, a state in which one or more metal elements are unevenly distributed and regions including the one or more metal elements are mixed at a size of greater than or equal to 0.5 nm and less than or equal to 10 nm, preferably greater than or equal to 1 nm and less than or equal to 2 nm, or a similar size in an oxide semiconductor is referred to as a mosaic pattern or a patch-like pattern.

Note that an oxide semiconductor preferably contains at least indium. In particular, indium and zinc are preferably contained. Moreover, in addition to these, one kind or a plurality of kinds selected from aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, or the like may be contained.

For instance, a CAC-OS in an In—Ga—Zn oxide (an In—Ga—Zn oxide in the CAC-OS may be particularly referred to as CAC-IGZO) has a composition in which materials are separated into indium oxide (hereinafter $InO_{X1}$ (X1 is a real number greater than 0)) or indium zinc oxide (hereinafter $In_{X2}Zn_{Y2}O_{Z2}$ (X2, Y2, and Z2 are real numbers greater than 0)) and gallium oxide (hereinafter $GaO_{X3}$ (X3 is a real number greater than 0)) or gallium zinc oxide (hereinafter $Ga_{X4}Zn_{Y4}O_{Z4}$ (X4, Y4, and Z4 are real numbers greater than 0)), for example, so that a mosaic pattern is formed, and the mosaic pattern of $InO_{X1}$ or $In_{X2}Zn_{Y2}O_{Z2}$ is evenly distributed in the film (which is hereinafter also referred to as cloud-like composition).

That is, the CAC-OS is a composite oxide semiconductor having a composition in which a region where $GaO_{X3}$ is a main component and a region where $In_{X2}Zn_{Y2}O_{Z2}$ or $InO_{X1}$ is a main component are mixed. Note that in this specification, for example, when the atomic ratio of In to an element M in a first region is greater than the atomic ratio of In to an element M in a second region, the first region is described as having higher In concentration than the second region.

Note that IGZO is a commonly known name and sometimes refers to one compound formed of In, Ga, Zn, and O. A typical example is a crystalline compound represented by $InGaO_3(ZnO)_{m1}$ (m1 is a natural number) or $In_{(1+x0)}Ga_{(1-x0)}O_3(ZnO)_{m0}$ ($-1\leq x0\leq 1$; m0 is any given number).

The above crystalline compound has a single crystal structure, a polycrystalline structure, or a CAAC structure. Note that the CAAC structure is a crystal structure in which a plurality of IGZO nanocrystals have c-axis alignment and are connected in the a-b plane direction without alignment.

The CAC-OS relates to the material composition of an oxide semiconductor. The CAC-OS refers to a composition in which, in the material composition containing In, Ga, Zn, and O, some regions that include Ga as a main component and are observed as nanoparticles and some regions that include In as a main component and are observed as nanoparticles are randomly dispersed in a mosaic pattern. Thus, the crystal structure is a secondary element for the CAC-OS.

Note that in the CAC-OS, a layered structure of two or more films with different compositions is not included. For example, a two-layer structure of a film containing In as a main component and a film containing Ga as a main component is not included.

Note that sometimes, a clear boundary cannot be observed between the region where $GaO_{X3}$ is a main component and the region where $In_{X2}Zn_{Y2}O_{Z2}$ or $InO_{X1}$ is a main component.

Note that in the case where one kind or a plurality of kinds selected from aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, or the like are contained instead of gallium, the CAC-OS refers to a composition in which some regions that contain the one kind or a plurality of kinds of metal elements as a main component and are observed as nanoparticles and some regions that contain In as a main component and are observed as nanoparticles are randomly dispersed in a mosaic pattern.

The CAC-OS can be formed by a sputtering method under a condition where a substrate is not heated, for example. Moreover, in the case of forming the CAC-OS by a sputtering method, any one or more selected from an inert gas (typically, argon), an oxygen gas, and a nitrogen gas are used as a deposition gas. The flow rate of the oxygen gas to the total flow rate of the deposition gas in deposition is preferably as low as possible. For example, the flow rate of the oxygen gas is preferably higher than or equal to 0% and lower than 30%, also preferably higher than or equal to 0% and lower than or equal to 10%.

The CAC-OS is characterized in that a clear peak is not observed when measurement is conducted using a θ/2θ scan by an Out-of-plane method, which is an X-ray diffraction (XRD) measurement method. That is, it is found from the analysis results of the X-ray diffraction that no alignment in the a-b plane direction and the c-axis direction is observed in a measured region.

In the CAC-OS, an electron diffraction pattern that is obtained by irradiation with an electron beam with a probe diameter of 1 nm (also referred to as nanobeam electron beam) has a region with high luminance in a ring pattern and a plurality of bright spots is observed in the region with the ring pattern. It is therefore found from the electron diffraction pattern that the crystal structure of the CAC-OS includes an nc (nano-crystal) structure with no alignment in the plan-view direction and the cross-sectional direction.

Moreover, for example, it can be confirmed by EDX mapping obtained using energy dispersive X-ray spectroscopy (EDX) that the CAC-OS in the In—Ga—Zn oxide has a structure in which regions where $GaO_{X3}$ is a main component and regions where $In_{X2}Zn_{Y2}O_{Z2}$ or $InO_{X1}$ is a main component are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are phase-separated from each other, and the regions including the respective elements as the main components form a mosaic pattern.

A region including $In_{X2}Zn_{Y2}O_{Z2}$ or $InO_{X1}$ as a main component is a region with high conductivity compared to a region including $GaO_{X3}$ or the like as a main component. In other words, when carriers flow through the regions where $In_{X2}Zn_{Y2}O_{Z2}$ or $InO_{X1}$ is a main component, the conductivity of an oxide semiconductor is exhibited. Accordingly, when the regions where $In_{X2}Zn_{Y2}O_{Z2}$ or $InO_{X1}$ is a main component are distributed like a cloud in an oxide semiconductor, high field-effect mobility (μ) can be achieved.

In contrast, a region including $GaO_{X3}$ or the like as a main component is a region with high insulating property compared to a region including $In_{X2}Zn_{Y2}O_{Z2}$ or $InO_{X1}$ as a main component. In other words, when regions including $GaO_{X3}$ or the like as a main component are distributed in an oxide semiconductor, leakage current can be suppressed and favorable switching operation can be achieved.

Accordingly, when the CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby a high on-state current ($I_{on}$) and high field-effect mobility (μ) can be achieved.

A semiconductor element using a CAC-OS has high reliability. Thus, the CAC-OS is suitable as a constituent material in a variety of semiconductor devices.

This embodiment can be implemented in combination with any of the structures described in the other embodiments and the like as appropriate.

Embodiment 4

In this embodiment, structure examples of a liquid crystal display device will be described.

Figure 12A:
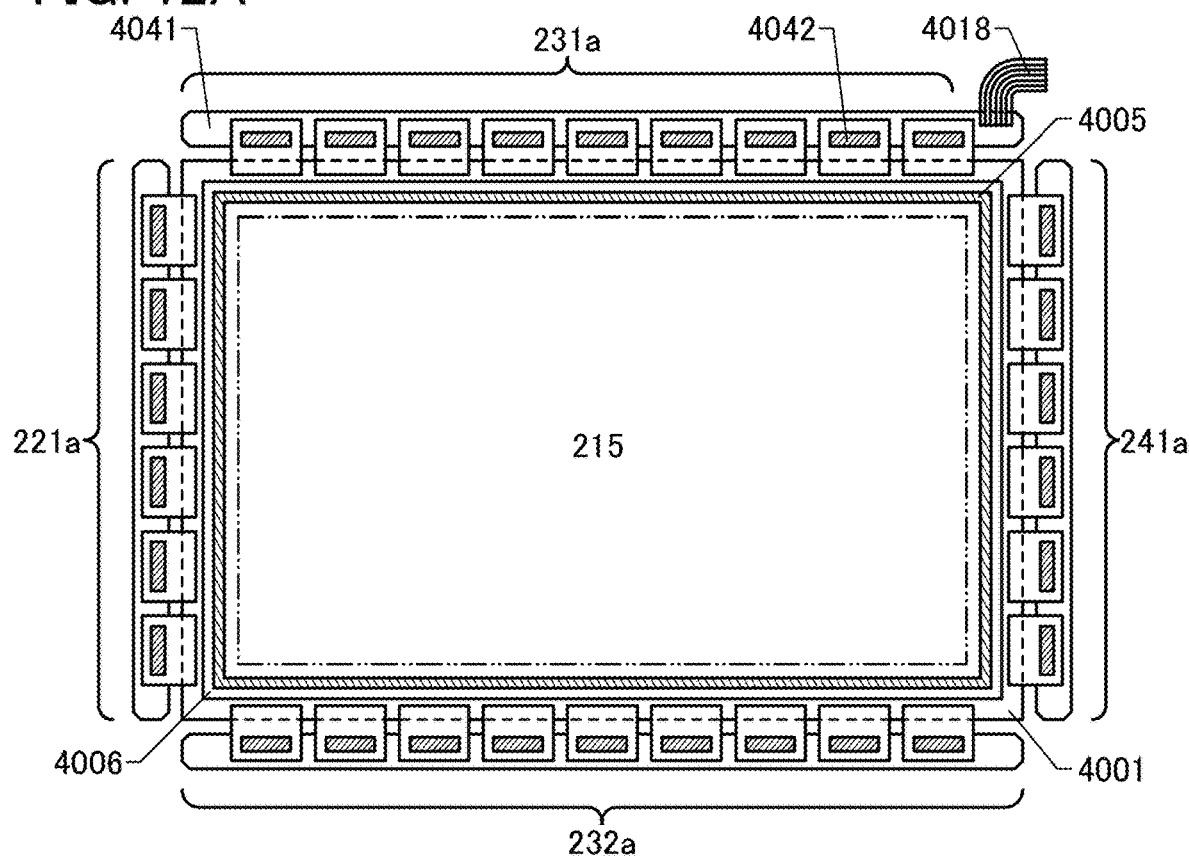
FIG. 12 Diagrams illustrating structure examples of a liquid crystal display device.

In FIG. 12(A), a sealant 4005 is provided to surround a display portion 215 provided over a first substrate 4001, and the display portion 215 is sealed with the sealant 4005 and a second substrate 4006.

A pixel array including the pixels described in Embodiment 1 is provided in the display portion 215.

Note that the suitable number of pixels provided in the pixel array is 3840×2160 or 7680×4320, in which case ultra high definition ("4K resolution", "4K2K", or "4K") or super high definition ("8K resolution", "8K4K", or "8K") images can be displayed. With such a structure, high-resolution images can be viewed on a large-sized liquid crystal display device.

In the case of a structure for displaying 8K4K images or 4K2K images, a suitable structure is a structure in which driver circuits are positioned on both sides of a pixel array and the number of wirings such as scan lines and signal lines are increased. With such a structure, malfunctions such as signal delay and voltage drop, which are caused by an increase in wiring resistance due to an increase in the number of pixels, can be reduced.

In FIG. 12(A), a scan line driver circuit 221a, a signal line driver circuit 231a, a signal line driver circuit 232a, and a common line driver circuit 241a each include a plurality of integrated circuits 4042 provided over a printed board 4041. The integrated circuits 4042 are each formed using a single crystal semiconductor or a polycrystalline semiconductor. The signal line driver circuit 231a and the signal line driver circuit 232a each have a function of a source driver. The scan line driver circuit 221a has a function of the gate driver described in the above embodiments. The common line driver circuit 241a has a function of supplying a prescribed potential to a common wiring.

Various signals and potentials are supplied to the scan line driver circuit 221a, the common line driver circuit 241a, the signal line driver circuit 231a, and the signal line driver circuit 232a through an FPC (Flexible printed circuit) 4018.

The integrated circuits 4042 included in the scan line driver circuit 221a and the common line driver circuit 241a each have a function of supplying a selection signal to the display portion 215. The integrated circuits 4042 included in the signal line driver circuit 231a and the signal line driver circuit 232a each have a function of supplying an image signal to the display portion 215. The integrated circuits 4042 are mounted on a region different from a region surrounded by the sealant 4005 over the first substrate 4001.

Note that the connection method of the integrated circuits 4042 is not particularly limited, and a wire bonding method, a COG (Chip On Glass) method, a TCP (Tape Carrier Package) method, a COF (Chip On Film) method, or the like can be used.

Figure 12B:
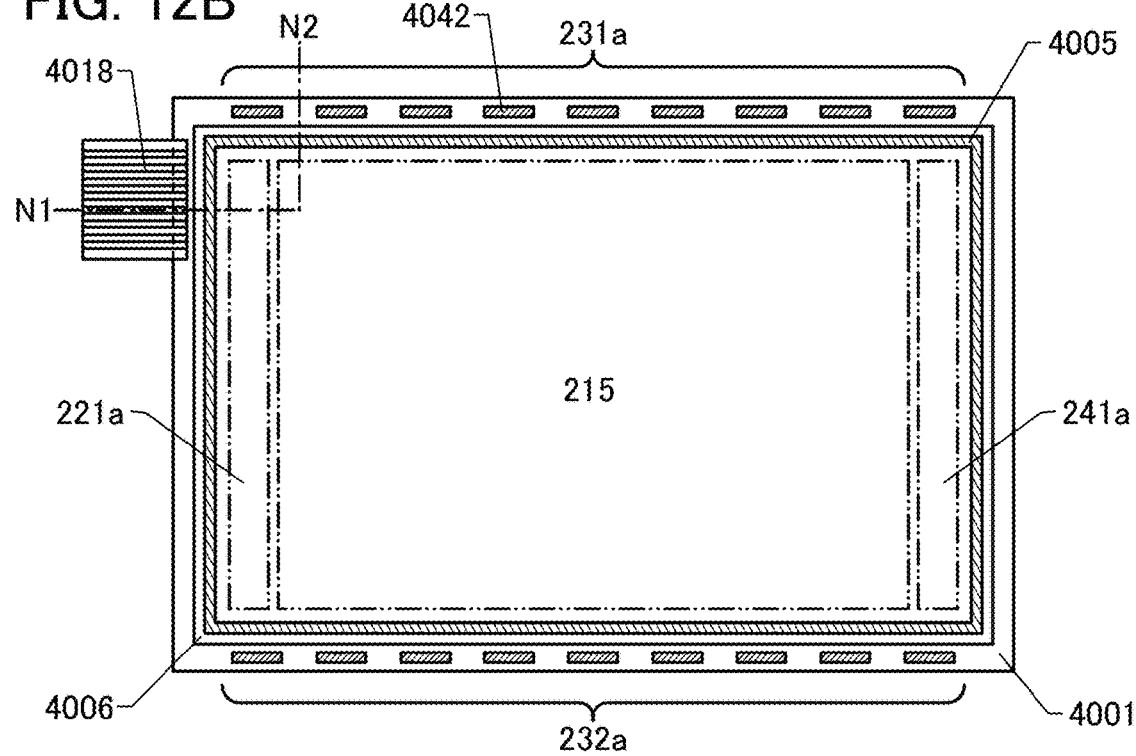

FIG. 12(B) illustrates an example of mounting the integrated circuits 4042 included in the signal line driver circuit 231a and the signal line driver circuit 232a by a COG method. Some or all of the driver circuits can be integrally formed over a substrate over which the display portion 215 is formed, whereby a system-on-panel can be obtained.

In the example shown in FIG. 12(B), the scan line driver circuit 221a and the common line driver circuit 241a are formed over the substrate over which the display portion 215 is formed. When the driver circuits are formed concurrently with the pixel circuits in the display portion 215, the number of components can be reduced. Accordingly, the productivity can be increased.

In addition, in FIG. 12(B), the sealant 4005 is provided to surround the display portion 215, the scan line driver circuit 221a, and the common line driver circuit 241a that are provided over the first substrate 4001. The second substrate 4006 is provided over the display portion 215, the scan line driver circuit 221a, and the common line driver circuit 241a. Consequently, the display portion 215, the scan line driver circuit 221a, and the common line driver circuit 241a are sealed together with a display element by the first substrate 4001, the sealant 4005, and the second substrate 4006.

Although the signal line driver circuit 231a and the signal line driver circuit 232a are formed separately and mounted on the first substrate 4001 in the example shown in FIG. 12(B), the structure is not limited thereto. The scan line driver circuits may be formed separately and then mounted, or part of the signal line driver circuits or part of the scan line driver circuits may be separately formed and then mounted.

In some cases, the liquid crystal display device includes a panel in which a liquid crystal element is sealed, and a module in which an IC or the like including a controller mounted on the panel.

The display portion and the scan line driver circuits formed over the first substrate each include a plurality of transistors. Any of the transistors described in the above embodiments can be used as the transistors.

Transistors included in the peripheral driver circuits and transistors included in the pixel circuits of the display portion may have the same structure or different structures. The transistors included in the peripheral driver circuits may have the same structure or a combination of two or more kinds of structures. Similarly, the transistors included in the pixel circuits may have the same structure or a combination of two or more kinds of structures.

In addition, as shown in FIG. 13, an input device 4200 can be provided over the second substrate 4006. The structure where the liquid crystal display device illustrated in FIG. 12 is provided with the input device 4200 can function as a touch panel.

There is no limitation on a detection element (also referred to as a sensor element) included in the touch panel of one embodiment of the present invention. A variety of sensors such as a finger or a stylus that can sense proximity or touch of a sensing target can be used as the sensor element.

For example, a variety of types such as a capacitive type, a resistive type, a surface acoustic wave type, an infrared type, an optical type, and a pressure-sensitive type can be used as the sensor type.

In this embodiment, a touch panel including a capacitive type sensor element will be described as an example.

Examples of the capacitive type include a surface capacitive type and a projected capacitive type. Examples of the projected capacitive type include a self-capacitive type and a mutual capacitive type. The use of a mutual capacitive type is preferable because multiple points can be sensed simultaneously.

The touch panel of one embodiment of the present invention can have a variety of structures such as a structure in which a liquid crystal display device and a sensor element that are separately formed are attached to each other and a structure in which electrodes and the like included in a sensor element are provided on one or both of a substrate supporting a display element and a counter substrate.

Figure 13A:
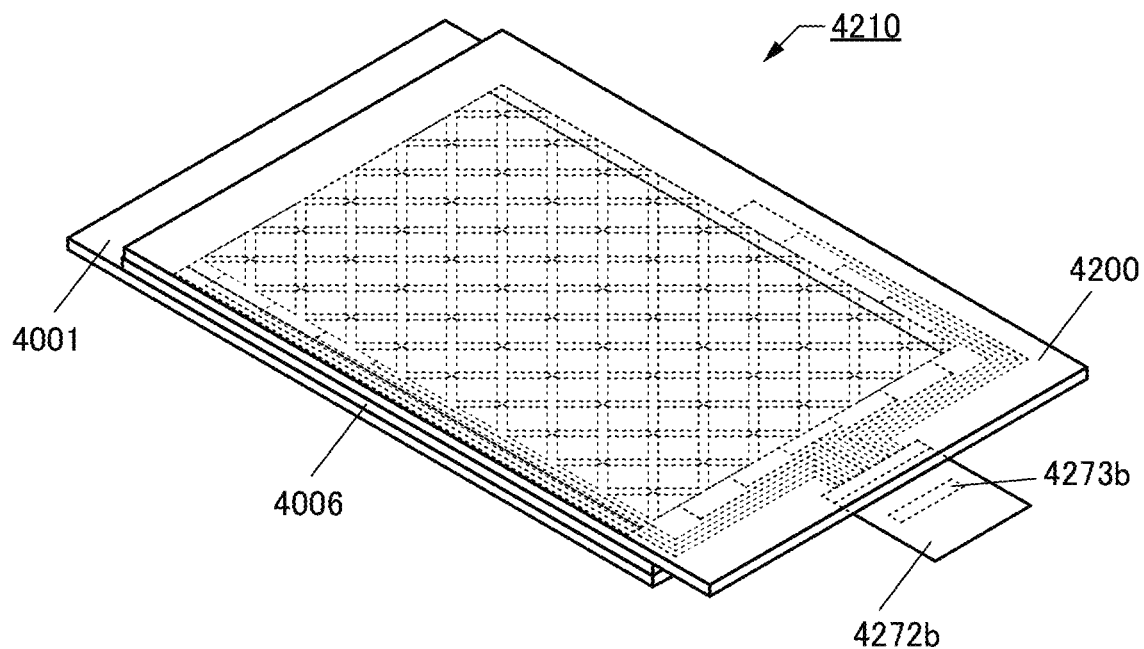
FIG. 13 Diagrams illustrating structure examples of a touch panel.
Figure 13B:
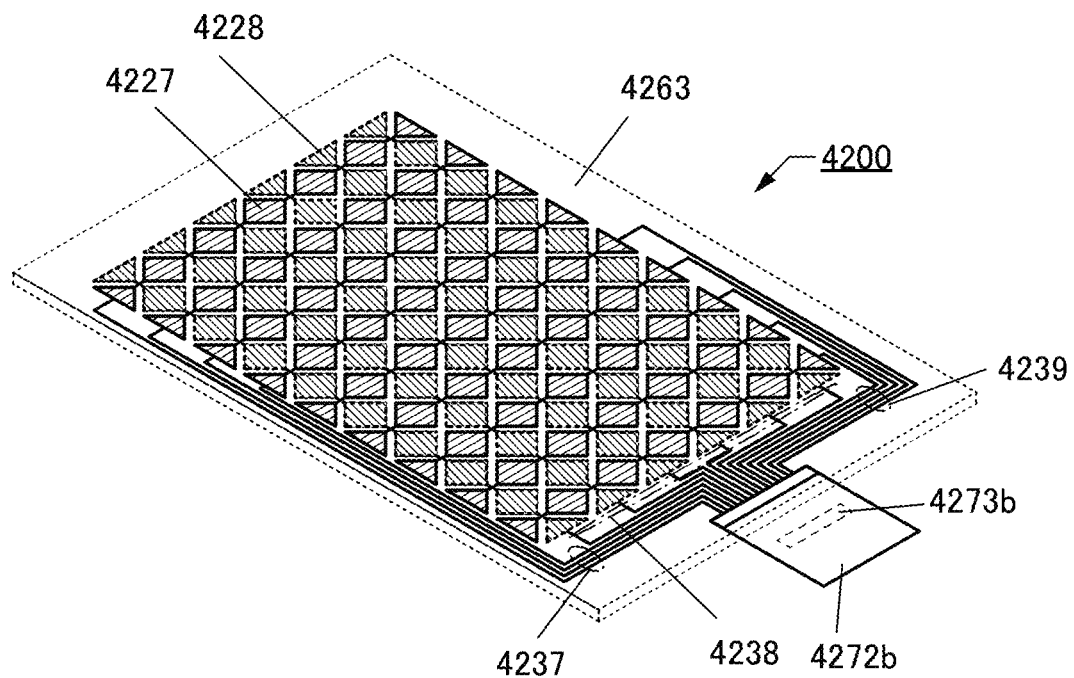

FIGS. 13(A) and 13(B) illustrate an example of the touch panel. FIG. 13(A) is a perspective view of a touch panel 4210. FIG. 13(B) is a schematic perspective view of the input device 4200. Note that for clarity, only the major components are illustrated.

The touch panel 4210 has a structure in which a liquid crystal display device and a sensor element that are formed separately are bonded together.

The touch panel 4210 includes the input device 4200 and the liquid crystal display device, which are provided to overlap with each other.

The input device 4200 includes a substrate 4263, an electrode 4227, an electrode 4228, a plurality of wirings 4237, a plurality of wirings 4238, and a plurality of wirings 4239. For example, the electrode 4227 can be electrically connected to the wiring 4237 or the wiring 4239. In addition, the electrode 4228 can be electrically connected to the wiring 4239. An FPC 4272b is electrically connected to each of the plurality of wirings 4237 and the plurality of wirings 4238. An IC 4273b can be provided on the FPC 4272b.

Alternatively, a touch sensor may be provided between the first substrate 4001 and the second substrate 4006 of the liquid crystal display device. In the case where a touch sensor is provided between the first substrate 4001 and the second substrate 4006, in addition to a capacitive type touch sensor, an optical type touch sensor using a photoelectric conversion element may be used.

Figure 14:
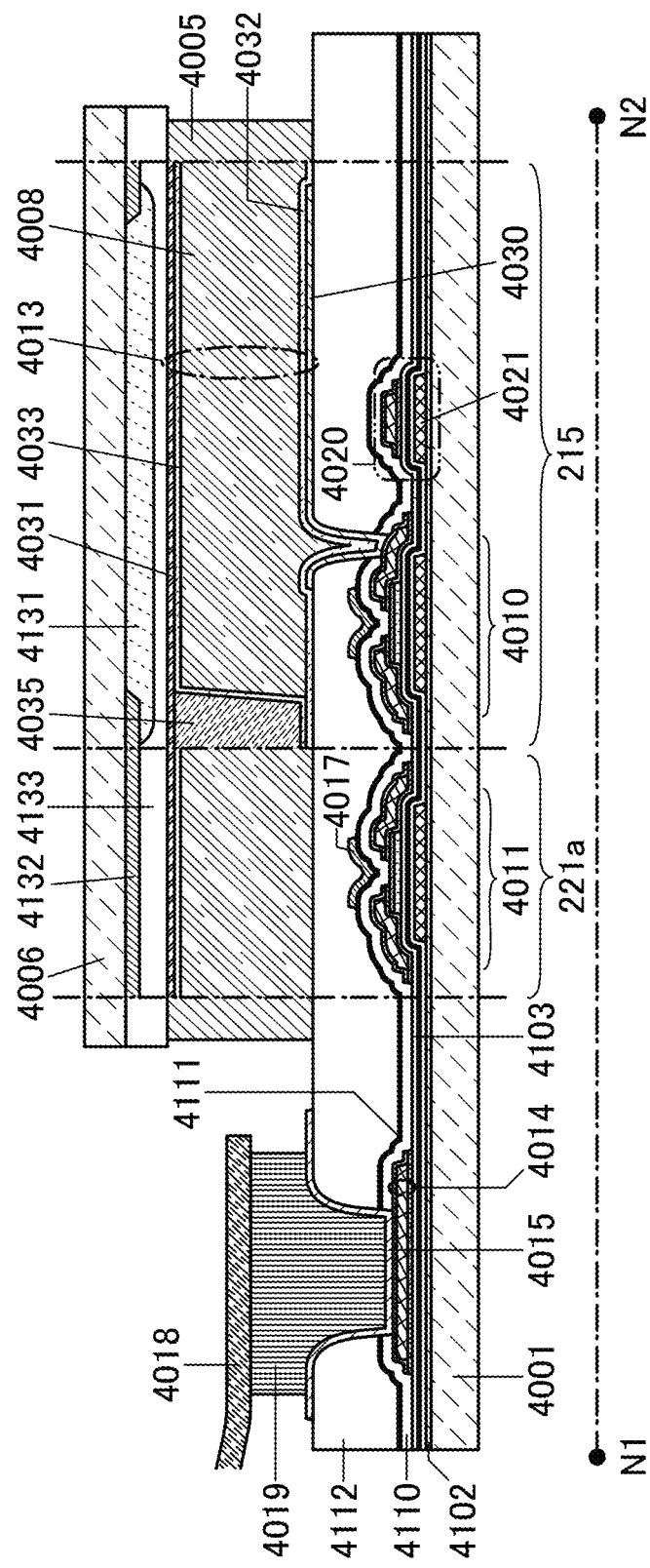
FIG. 14 A diagram illustrating a structure example of a liquid crystal display device.

FIG. 14 is a cross-sectional view taken along the chain line N1-N2 in FIG. 12(B). A liquid crystal display device shown in FIG. 14 includes an electrode 4015, and the electrode 4015 is electrically connected to a terminal included in the FPC 4018 through an anisotropic conductive layer 4019. In FIG. 14, the electrode 4015 is electrically connected to a wiring 4014 in an opening formed in an insulating layer 4112, an insulating layer 4111, and an insulating layer 4110.

The electrode 4015 is formed of the same conductive layer as a first electrode layer 4030, and the wiring 4014 is formed of the same conductive layer as the source electrodes and the drain electrodes of a transistor 4010 and a transistor 4011.

The display portion 215 and the scan line driver circuit 221a provided over the first substrate 4001 each include a plurality of transistors. In FIG. 14, the transistor 4010 included in the display portion 215 and the transistor 4011 included in the scan line driver circuit 221a are shown are shown as examples. In FIG. 14, the transistor 4010 and the transistor 4011 are shown as examples of bottom-gate transistors, but they may also be top-gate transistors.

In FIG. 14, the insulating layer 4112 is provided over the transistor 4010 and the transistor 4011.

The transistor 4010 and the transistor 4011 are provided over an insulating layer 4102. The transistor 4010 and the transistor 4011 each include an electrode 4017 formed over the insulating layer 4111. The electrode 4017 can serve as a back gate electrode.

The liquid crystal display device shown in FIG. 14 includes a capacitor 4020. The capacitor 4020 includes an electrode 4021 formed in the same step as a gate electrode of the transistor 4010, and an electrode formed in the same step as a source electrode and a drain electrode of the transistor 4010. Each of the electrodes of the capacitor 4020 overlap with each other with an insulating layer 4103 therebetween.

In general, the capacitance of a capacitor provided in a pixel portion of a liquid crystal display device is set in consideration of the leakage current or the like of transistors provided in the pixel portion so that charges can be held for a predetermined period. The capacitance of the capacitor may be set considering the off-state current of the transistor or the like.

FIG. 14 is an example of a liquid crystal display device using a transmissive liquid crystal element as a display element. In FIG. 14, a liquid crystal element 4013 which is a display element includes the first electrode layer 4030, a second electrode layer 4031, and a liquid crystal layer 4008. Note that an insulating layer 4032 and an insulating layer 4033 functioning as alignment films are provided so that the liquid crystal layer 4008 is interposed therebetween. The second electrode layer 4031 is provided on the second substrate 4006 side, and the first electrode layer 4030 and the second electrode layer 4031 overlap with each other with the liquid crystal layer 4008 therebetween. The transistor 4010 provided in the display portion 215 is electrically connected to the liquid crystal element 4013.

A conductive material which transmits visible light is suitable for using in the first electrode layer 4030 and the second electrode layer 4031. For example, a material containing one or more kinds selected from indium (In), zinc (Zn), and tin (Sn) can be used as the conductive material. Specifically, examples include indium oxide, indium tin oxide (ITO), indium zinc oxide, indium oxide containing tungsten oxide, indium zinc oxide containing tungsten oxide, indium oxide containing titanium oxide, indium tin oxide containing titanium oxide, indium tin oxide containing silicon oxide (ITSO), zinc oxide, and zinc oxide containing gallium. Note that a film containing graphene can be used. The film containing graphene can be formed by reducing a film containing graphene oxide formed over a film, for example.

As the liquid crystal element 4013, a liquid crystal element employing an FFS (Fringe Field Switching) mode can be used. Moreover, in general, liquid crystal materials include a positive-type liquid crystal material with a positive dielectric anisotropy (A) and a negative-type liquid crystal material with a negative dielectric anisotropy. Both of the materials can be used for the liquid crystal element 4013 in this embodiment, and an optimal liquid crystal material can be selected according to the employed mode and design.

In the liquid crystal display device in this embodiment, a negative liquid crystal material is preferably used. The negative liquid crystal is less affected by a flexoelectric effect, which is attributed to the polarization of liquid crystal molecules, and thus the polarity makes little difference in transmittance. This prevents flickering from being recognized by the user of the liquid crystal display device. The flexoelectric effect is a phenomenon in which polarization is induced by deformation, and is mainly caused by the shape of a molecule. The negative liquid crystal material is less likely to experience deformation such as spreading and bending.

Note that although an element employing an FFS mode is used as the liquid crystal element 4013 here, the liquid crystal element 4013 is not limited thereto, and liquid crystal elements employing a variety of modes can be used. For example, a liquid crystal element employing a VA (Vertical Alignment) mode, a TN (Twisted Nematic) mode, an IPS (In-Plane-Switching) mode, an ASM (Axially Symmetric aligned Micro-cell) mode, an OCB (Optically Compensated Birefringence) mode, an FLC (Ferroelectric Liquid Crystal) mode, an AFLC (AntiFerroelectric Liquid Crystal) mode, an ECB (Electrically Controlled Birefringence) mode, a VA-IPS mode, a guest-host mode, or the like can be used.

As the liquid crystal display device of this embodiment, a normally black liquid crystal display device such as a transmissive liquid crystal display device employing a vertical alignment (VA) mode may be used. Examples of the vertical alignment mode include an MVA (Multi-Domain Vertical Alignment) mode, a PVA (Patterned Vertical Alignment) mode, and an ASV (Advanced Super View) mode.

Note that the liquid crystal element is an element that controls transmission or non-transmission of light by the optical modulation action of liquid crystal. The optical modulation action of the liquid crystal is controlled by an electric field applied to the liquid crystal (including a horizontal electric field, a vertical electric field, and an oblique electric field). As the liquid crystal used for the liquid crystal element, thermotropic liquid crystal, low-molecular liquid crystal, high-molecular liquid crystal, polymer dispersed liquid crystal (PDLC), ferroelectric liquid crystal, anti-ferroelectric liquid crystal, or the like can be used. Such a liquid crystal material exhibits a cholesteric phase, a smectic phase, a cubic phase, a chiral nematic phase, an isotropic phase, or the like depending on conditions.

Although an example of a liquid crystal display device including a liquid crystal element with a vertical electric field mode is illustrated in FIG. 14, one embodiment of the present invention can be applied to a liquid crystal display device including a liquid crystal element with a horizontal electric field mode. In the case of employing a horizontal electric field mode, liquid crystal exhibiting a blue phase for which an alignment film is not used may be used. The blue phase is one of the liquid crystal phases, which appears just before a cholesteric phase changes into an isotropic phase when the temperature of a cholesteric liquid crystal is increased. Since the blue phase appears only in a narrow temperature range, a liquid crystal composition in which a chiral material is mixed to account for 5 weight % or more is used for the liquid crystal layer 4008 in order to improve the temperature range. The liquid crystal composition that contains liquid crystal exhibiting a blue phase and a chiral material has a short response time and exhibits optical isotropy. In addition, the liquid crystal composition containing a liquid crystal exhibiting a blue phase and a chiral material does not need alignment treatment and has small viewing angle dependence. Since an alignment film need not be provided and rubbing treatment becomes unnecessary, electrostatic discharge damage caused by the rubbing treatment can be prevented and defects or damage of the liquid crystal display device in the manufacturing process can be reduced.

A spacer 4035 is a columnar spacer obtained by selective etching of an insulating layer and is provided to control the distance (cell gap) between the first electrode layer 4030 and the second electrode layer 4031. Note that a spherical spacer may be used.

In addition, a black matrix (light-blocking layer), a coloring layer (color filter), an optical member (optical substrate) such as a polarizing member, a retardation member, or an anti-reflection member, and the like may be provided as appropriate if needed. For example, circular polarization using a polarizing substrate and a retardation substrate may be employed. Furthermore, a backlight unit, a side light unit, or the like may be used as a light source. Moreover, a micro LED or the like may be used as the backlight unit or the side light unit. In the case of the liquid crystal display device illustrated in FIG. 14, for example, a polarizing substrate may be provided on each of the surface of the second substrate 4006 (the surface on the side opposite to the side where a coloring layer 4131 and a light-blocking layer 4132 are provided) and the rear surface of the first substrate 4001 (the surface on the side opposite to the side where the insulating layer 4102 is provided), and a backlight unit may be provided on the rear surface side of the first substrate 4001 with the polarizing substrate therebetween (not illustrated).

In the liquid crystal display device illustrated in FIG. 14, the light-blocking layer 4132, the coloring layer 4131, and an insulating layer 4133 are provided between the second substrate 4006 and the second electrode layer 4031.

Examples of a material that can be used for the light-blocking layer 4132 include carbon black, titanium black, a metal, a metal oxide, and a composite oxide containing a solid solution of a plurality of metal oxides. The light-blocking layer may be a film containing a resin material or may be a thin film of an inorganic material such as a metal. A stacked-layer film of films containing the material of the coloring layer 4131 can also be used for the light-blocking layer 4132. For example, it is possible to employ a stacked-layer structure of a film containing a material used for the coloring layer 4131 that transmits light of a certain color and a film containing a material used for the coloring layer 4131 that transmits light of another color. Sharing materials between the coloring layer 4131 and the light-blocking layer 4132 is preferable because process simplification as well as equipment sharing can be achieved.

Examples of a material that can be used for the coloring layer 4131 include a metal material, a resin material, and a resin material containing a pigment or a dye. The light-blocking layer and the coloring layer is formed by a method similar to the method for forming each layer. For example, the light-blocking layer and the coloring layer may be formed by an inkjet method or the like.

The insulating layer 4133 is preferably an overcoat having a planarization function. With the insulating layer 4133 having a planarization function, a flat insulating film can be formed over a formation surface of the coloring layer 4131 and the light-blocking layer 4132 each having a different thickness. Since the second electrode layer 4031 can be formed flat owing to the planarization of the insulating layer 4133, a thickness variation of the liquid crystal layer 4008 can be reduced. An acrylic resin or the like can be given as an example of such an insulating layer 4133.

The liquid crystal display device shown in FIG. 14 includes the insulating layer 4111 and the insulating layer 4102. As the insulating layer 4111 and the insulating layer 4102, insulating layers that do not easily allow an impurity element to pass through are used. A transistor is interposed between the insulating layer 4111 and the insulating layer 4102, whereby entry of impurities from the outside into the semiconductor layer can be prevented.

Since the transistor is easily damaged by static electricity or the like, a protective circuit for protecting the driver circuit is preferably provided. The protective circuit is preferably formed using a nonlinear element.

Note that this embodiment can be combined with other embodiments in this specification as appropriate.

Embodiment 5

In this embodiment, examples of transistors that can be used as substitutes of the transistors described in the above embodiments will be described with reference to the drawings.

The liquid crystal display device of one embodiment of the present invention can be fabricated using a transistor with any of various structures, such as a bottom-gate transistor or a top-gate transistor. Therefore, a material for a semiconductor layer or the structure of a transistor to be used can be easily substituted according to the existing production line.

[Bottom-Gate Transistor]

FIG. 15(A1) is a cross-sectional view of a channel-protective transistor 810 that is a type of bottom-gate transistor. In FIG. 15(A1), the transistor 810 is formed over a substrate 771. The transistor 810 includes an electrode 746 over the substrate 771 with an insulating layer 772 therebetween. The transistor 810 includes a semiconductor layer 742 over the electrode 746 with an insulating layer 726 therebetween. The electrode 746 can function as a gate electrode. The insulating layer 726 can function as a gate insulating layer.

Furthermore, an insulating layer 741 is provided over a channel formation region in the semiconductor layer 742. Furthermore, an electrode 744a and an electrode 744b are provided to be partly in contact with the semiconductor layer 742 and over the insulating layer 726. The electrode 744a can function as one of a source electrode or a drain electrode. The electrode 744b can function as the other of the source electrode or the drain electrode. Part of the electrode 744a and part of the electrode 744b are formed over the insulating layer 741.

The insulating layer 741 can function as a channel protective layer. With the insulating layer 741 provided over the channel formation region, the semiconductor layer 742 can be prevented from being exposed at the time of forming the electrode 744a and the electrode 744b. Thus, the channel formation region in the semiconductor layer 742 can be prevented from being etched at the time of forming the electrode 744a and the electrode 744b. According to one embodiment of the present invention, a transistor with favorable electrical characteristics can be provided.

The transistor 810 includes an insulating layer 728 over the electrode 744a, the electrode 744b, and the insulating layer 741, and includes an insulating layer 729 over the insulating layer 728.

In the case where an oxide semiconductor is used for the semiconductor layer 742, a material capable of removing oxygen from part of the semiconductor layer 742 to generate oxygen vacancies is preferably used at least for portions of the electrode 744a and the electrode 744b that are in contact with the semiconductor layer 742. The carrier concentration in the regions of the semiconductor layer 742 where oxygen vacancies are generated is increased, and the regions become n-type regions (n⁺ layers). Accordingly, the regions can function as a source region or a drain region. When an oxide semiconductor is used for the semiconductor layer 742, examples of the material capable of removing oxygen from the semiconductor layer 742 to generate oxygen vacancies include tungsten and titanium.

Formation of the source region and the drain region in the semiconductor layer 742 makes it possible to reduce contact resistance between the semiconductor layer 742 and each of the electrode 744a and the electrode 744b. Accordingly, the electrical characteristics of the transistor, such as the field-effect mobility and the threshold voltage, can become favorable.

In the case where a semiconductor such as silicon is used for the semiconductor layer 742, a layer that functions as an n-type semiconductor or a p-type semiconductor is preferably provided between the semiconductor layer 742 and the electrode 744a and between the semiconductor layer 742 and the electrode 744b. The layer that functions as an n-type semiconductor or a p-type semiconductor can function as the source region or the drain region of the transistor.

The insulating layer 729 is preferably formed using a material that has a function of preventing or reducing diffusion of impurities into the transistor from the outside. Note that the insulating layer 729 can be omitted when necessary.

A transistor 811 illustrated in FIG. 15(A2) is different from the transistor 810 in that an electrode 723 that can function as a back gate electrode is provided over the insulating layer 729. The electrode 723 can be formed using a material and a method similar to those of the electrode 746.

In general, a back gate electrode is formed using a conductive layer and positioned so that a channel formation region of a semiconductor layer is interposed between a gate electrode and the back gate electrode. Thus, the back gate electrode can function in a manner similar to the gate electrode. The potential of the back gate electrode may be the same as that of the gate electrode, a ground potential (GND potential), or any given potential. By changing the potential of the back gate electrode without synchronization and independently of the potential of the gate electrode, the threshold voltage of the transistor can be changed.

The electrode 746 and the electrode 723 can both function as a gate electrode. Thus, the insulating layer 726, the insulating layer 741, the insulating layer 728, and the insulating layer 729 can each function as agate insulating layer. The electrode 723 may be provided between the insulating layer 728 and the insulating layer 729.

In the case where one of the electrode 746 or the electrode 723 is referred to as a "gate electrode", the other is referred to as a "back gate electrode". For example, in the transistor 811, in the case where the electrode 723 is referred to as a "gate electrode", the electrode 746 is referred to as a "back gate electrode". In the case where the electrode 723 is used as a"gate electrode", the transistor 811 can be regarded as a kind of top-gate transistor. One of the electrode 746 and the electrode 723 may be referred to as a "first gate electrode" and the other may be referred to as a "second gate electrode".

By providing the electrode 746 and the electrode 723 with the semiconductor layer 742 interposed therebetween and setting the potentials of the electrode 746 and the electrode 723 to the same potential, a region of the semiconductor layer 742 through which carriers flow is enlarged in the film thickness direction; thus, the amount of carrier transfer is increased. As a result, the on-state current and field-effect mobility of the transistor 811 are increased.

Therefore, the transistor 811 has a high on-state current with respect to its occupied area. That is, the area occupied by transistor 811 can be reduced for a required on-state current. According to one embodiment of the present invention, a liquid crystal display device in which the area occupied by a transistor is small can be provided.

The gate electrode and the back gate electrode are formed using conductive layers and thus each have a function of preventing an electric field generated outside the transistor from influencing the semiconductor layer in which the channel is formed (in particular, an electric field blocking function against static electricity and the like). When the back gate electrode is formed larger than the semiconductor layer such that the semiconductor layer is covered with the back gate electrode, the electric field blocking function can be enhanced.

When the back gate electrode is formed using a light-blocking conductive film, light can be prevented from entering the semiconductor layer from the back gate electrode side. Therefore, photodegradation of the semiconductor layer can be prevented, and deterioration in electrical characteristics of the transistor, such as a shift of the threshold voltage, can be prevented.

According to one embodiment of the present invention, a liquid crystal display device including a transistor with favorable reliability can be achieved.

FIG. 15(B1) is a cross-sectional view of a channel-protective transistor 820 that is a type of bottom-gate transistor. The transistor 820 has substantially the same structure as the transistor 810 but is different in that the insulating layer 741 covers end portions of the semiconductor layer 742. In addition, the semiconductor layer 742 is electrically connected to the electrode 744a in an opening portion formed by selectively removing part of the insulating layer 741 that overlaps with the semiconductor layer 742. Furthermore, the semiconductor layer 742 is electrically connected to the electrode 744b in another opening portion formed by selectively removing part of the insulating layer 741 that overlaps with the semiconductor layer 742. A region of the insulating layer 741 that overlaps with the channel formation region can function as a channel protective layer.

A transistor 821 illustrated in FIG. 15(B2) is different from the transistor 820 in that the electrode 723 which can function as a back gate electrode is provided over the insulating layer 729.

By providing the insulating layer 741, the semiconductor layer 742 can be prevented from being exposed at the time of forming the electrode 744a and the electrode 744b. Thus, the semiconductor layer 742 can be prevented from being reduced in thickness at the time of forming the electrode 744a and the electrode 744b.

The distance between the electrode 744a and the electrode 746 and the distance between the electrode 744b and the electrode 746 in the transistor 820 and the transistor 821 are greater than those in the transistor 810 and the transistor 811. Thus, parasitic capacitance generated between the electrode 744a and the electrode 746 can be reduced. Moreover, parasitic capacitance generated between the electrode 744b and the electrode 746 can be reduced. According to one embodiment of the present invention, a transistor with favorable electrical characteristics can be provided.

A transistor 825 illustrated in FIG. 15(C1) is a channel-etched transistor that is a type of bottom-gate transistor. In the transistor 825, the electrode 744a and the electrode 744b are formed without using the insulating layer 741. Thus, part of the semiconductor layer 742 that is exposed at the time of forming the electrode 744a and the electrode 744b is etched in some cases. However, since the insulating layer 741 is not provided, the productivity of the transistor can be increased.

A transistor 826 illustrated in FIG. 15(C2) is different from the transistor 825 in that the electrode 723 that can function as a back gate electrode is provided over the insulating layer 729.

[Top-Gate Transistor]

A transistor 842 illustrated in FIG. 16(A1) is a type of top-gate transistor. The electrode 744a and the electrode 744b are electrically connected to the semiconductor layer 742 through openings formed in the insulating layer 728 and the insulating layer 729.

Furthermore, as illustrated in FIG. 16(A3), part of the insulating layer 726 that does not overlap with the electrode 746 is removed, and an impurity 755 is introduced into the semiconductor layer 742 using the electrode 746 and the residual insulating layer 726 as masks, so that an impurity region can be formed in the semiconductor layer 742 in a self-aligned manner. The transistor 842 includes a region where the insulating layer 726 extends beyond the end portions of the electrode 746. The semiconductor layer 742 in a region where the impurity 755 is introduced through the insulating layer 726 has a lower impurity concentration than a region where the impurity 755 is introduced without through the insulating layer 726. Thus, an LDD (Lightly Doped Drain) region is formed in a region of the semiconductor layer 742 that does not overlap with the electrode 746.

A transistor 843 illustrated in FIG. 16(A2) is different from the transistor 842 in that the electrode 723 is included. The transistor 843 includes the electrode 723 formed over the substrate 771. The electrode 723 has a region overlapping with the semiconductor layer 742 with the insulating layer 772 therebetween. The electrode 723 can function as a back gate electrode.

As in a transistor 844 illustrated in FIG. 16(B1) and a transistor 845 illustrated in FIG. 16(B2), the insulating layer 726 in a region that does not overlap with the electrode 746 may be completely removed. In addition, as in a transistor 846 illustrated in FIG. 16(C1) and a transistor 847 illustrated in FIG. 16(C2), the insulating layer 726 may be left behind.

Also in the transistor 843 to the transistor 847, after the formation of the electrode 746, the impurity 755 is introduced into the semiconductor layer 742 using the electrode 746 as a mask, so that an impurity region can be formed in the semiconductor layer 742 in a self-aligned manner. According to one embodiment of the present invention, a liquid crystal display device including a highly integrated transistor with favorable electrical characteristics can be provided.

[Stacked Layer of Transistors]

The bottom-gate transistor and the top-gate transistor described above can be stacked. This structure is described with reference to FIGS. 17(A) and 17(B).

Figure 17A:
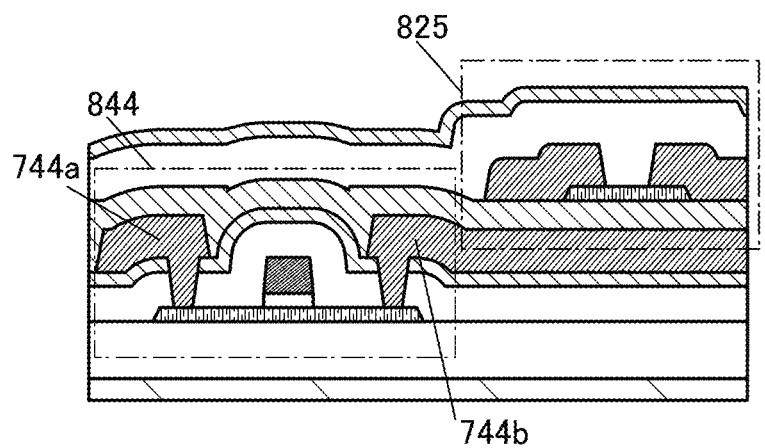
FIG. 17 Diagrams illustrating structure examples of transistors.

In the stacked-layer structure of the transistor 844 and the transistor 825 illustrated in FIG. 17(A), a layer including the transistor 825 over the transistor 844 is illustrated. The electrode 744b included in the transistor 844 can also serve as an electrode functioning as a gate electrode of the transistor 825. Such a structure enables a plurality of transistors to be efficiently arranged in a small layout area, so that the aperture ratio of a pixel in a liquid crystal display device can be improved.

Figure 17B:
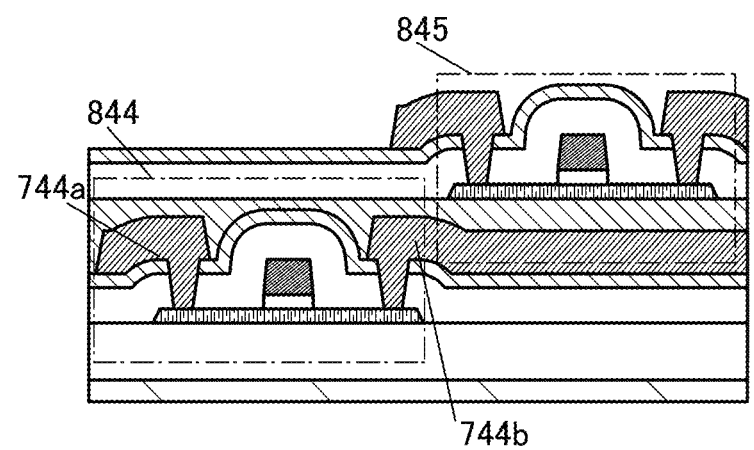

FIG. 17(B) illustrates a structure different from FIG. 17(A). In the stacked-layer structure of the transistor 844 and the transistor 845 illustrated in FIG. 17(B), a layer including the transistor 845 over the transistor 844 is illustrated. The electrode 744b included in the transistor 844 can also serve as an electrode functioning as a back gate electrode of the transistor 845. Such a structure enables a plurality of transistors to be efficiently arranged in a small layout area, so that the aperture ratio of a pixel in a liquid crystal display device can be improved.

This embodiment can be implemented in combination with any of the structures described in the other embodiments and the like as appropriate.

Embodiment 6

A semiconductor device that can be used for the liquid crystal display device described as an example in the above embodiment will be described in this embodiment. The semiconductor device described below as an example can function as a memory device.

In this embodiment, a DOSRAM (registered trademark) will be described as an example of a memory device using an oxide semiconductor. The name "DOSRAM" stands for a Dynamic Oxide Semiconductor Random Access Memory. A DOSRAM refers to a memory device including a 1T1C (one transistor and one capacitor) memory cell where a writing transistor is a transistor formed using oxide semiconductor.

A stacked-layered structure example of a DOSRAM 1000 will be described using FIG. 18. In the DOSRAM 1000, a sense amplifier portion 1002 that performs data reading and a cell array portion 1003 that stores data are stacked.

Figure 18:
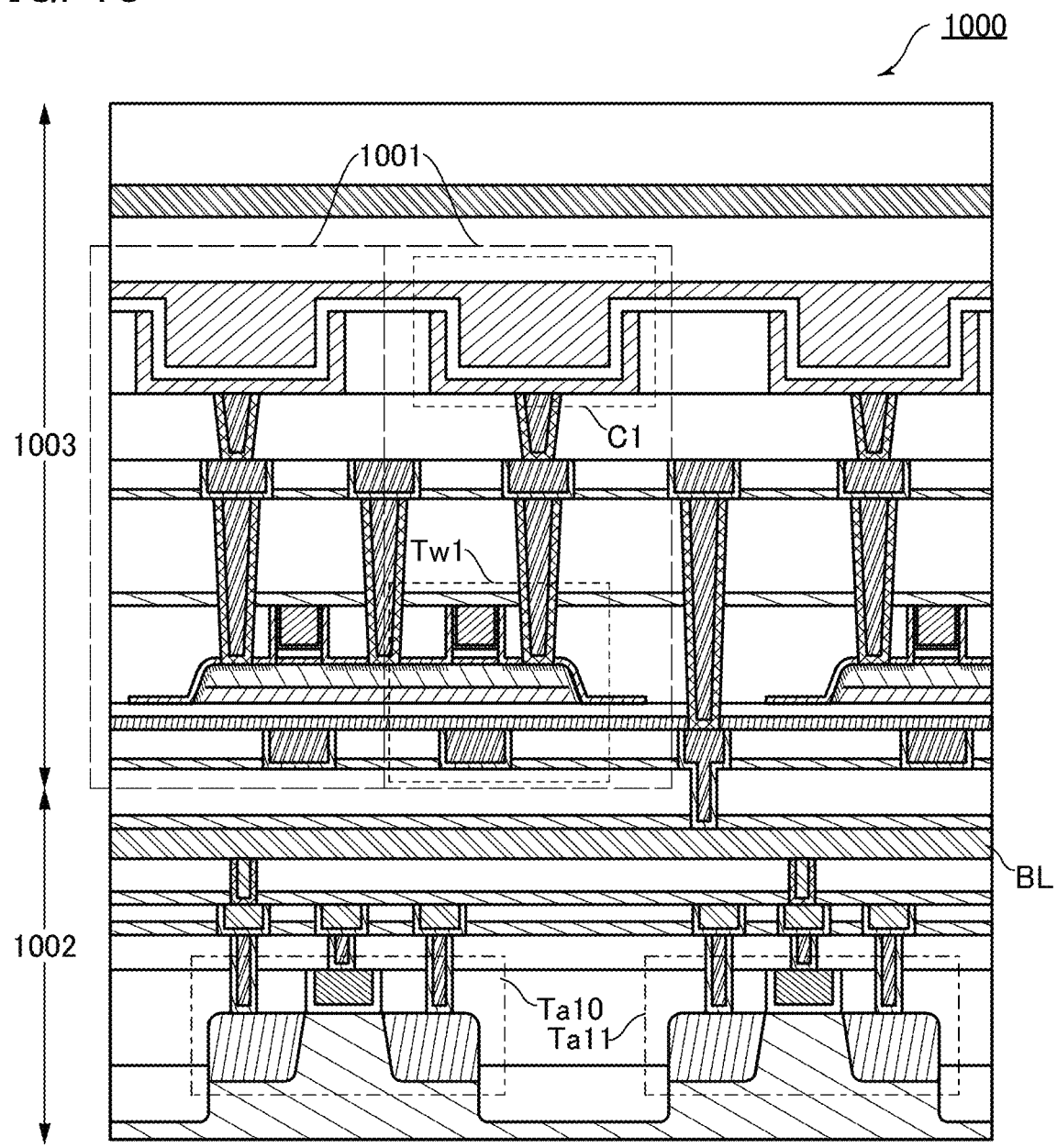
FIG. 18 A cross-sectional view illustrating a structure example of a DOSRAM.

As illustrated in FIG. 18, the sense amplifier portion 1002 includes a bit line BL and Si transistors Ta10 and Ta11. The Si transistors Ta10 and Ta11 include a semiconductor layer in a single crystal silicon wafer. The Si transistors Ta10 and Ta11 are included in the sense amplifier and electrically connected to the bit line BL.

The cell array portion 1003 includes a plurality of memory cells 1001. The memory cell 1001 includes a transistor Tw1 and a capacitor C1. In the cell array portion 1003, two transistors Tw1 share a semiconductor layer. The semiconductor layer and the bit line BL are electrically connected to each other through a conductor that is not illustrated.

The stacked-layer structure illustrated in FIG. 18 can be used for a variety of semiconductor devices formed by stacking a plurality of circuits each including a transistor group.

Metal oxides, insulators, conductors, and the like in FIG. 18 may be a single layer or a stacked layer. They can be formed by any of a variety of deposition methods such as a sputtering method, a molecular beam epitaxy (MBE) method, a pulsed laser ablation (PLA) method, a CVD method, and an atomic layer deposition (ALD) method. Examples of the CVD method include a plasma CVD method, a thermal CVD method, and a metal organic CVD method.

Here, the semiconductor layer of the transistor Tw1 is formed using a metal oxide (oxide semiconductor). An example is illustrated in which the semiconductor layer is formed of three metal oxide layers. The semiconductor layer is preferably formed using a metal oxide containing In, Ga, and Zn.

When an element that forms oxygen vacancies or an element that is bonded to oxygen vacancies is added to the metal oxide, the metal oxide may have increased carrier concentration and thus have reduced resistance. For example, the resistance of the semiconductor layer formed using the metal oxide is selectively reduced, whereby a source region or a drain region can be provided in the semiconductor layer.

As the element that reduces the resistance of the metal oxide, boron or phosphorus is typically used. Hydrogen, carbon, nitrogen, fluorine, sulfur, chlorine, titanium, a rare gas element, or the like can also be used. Typical examples of the rare gas include helium, neon, argon, krypton, and xenon. The concentration of the element can be measured by secondary ion mass spectrometry (SIMS) or the like.

In particular, boron and phosphorus are preferably used because an apparatus used in a manufacturing line for amorphous silicon or low-temperature polysilicon can be used. Since the existing facility can be used, capital investment can be reduced.

The transistor including the semiconductor layer whose resistance is selectively reduced can be formed using a dummy gate, for example. Specifically, the dummy gate is provided over the semiconductor layer, and an element that reduces the resistance of the semiconductor layer is preferably added to the semiconductor layer using the dummy gate as a mask. That is, the element is added to a region of the semiconductor layer that does not overlap with the dummy gate, so that a low-resistance region is formed. For the addition of the element, an ion implantation method by which an ionized source gas is subjected to mass separation and then added, an ion doping method by which an ionized source gas is added without mass separation, a plasma immersion ion implantation method, or the like can be used.

Examples of a conductive material used for the conductors include a semiconductor typified by polycrystalline silicon doped with an impurity element such as phosphorus; silicide such as nickel silicide; a metal such as molybdenum, titanium, tantalum, tungsten, aluminum, copper, chromium, neodymium, or scandium; and a metal nitride containing any of the above metals as its component (tantalum nitride, titanium nitride, molybdenum nitride, or tungsten nitride). A conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added can also be used.

Examples of an insulating material used for the insulators include aluminum nitride, aluminum oxide, aluminum nitride oxide, aluminum oxynitride, magnesium oxide, silicon nitride, silicon oxide, silicon nitride oxide, silicon oxynitride, gallium oxide, germanium oxide, yttrium oxide, zirconium oxide, lanthanum oxide, neodymium oxide, hafnium oxide, tantalum oxide, and aluminum silicate. Note that in this specification and the like, an oxynitride refers to a compound that contains more amount of oxygen than nitrogen, and a nitride oxide refers to a compound that contains more amount of nitrogen than oxygen.

Embodiment 7

Examples of an electronic device that can use the liquid crystal display device in one embodiment of the present invention include display devices, personal computers, image storage devices or image reproducing devices provided with storage media, cellular phones, game machines including portable game machines, portable data terminals, e-book readers, cameras such as video cameras and digital still cameras, goggle-type displays (head mounted displays), navigation systems, audio reproducing devices (car audio players, digital audio players and the like), copiers, facsimiles, printers, multifunction printers, automated teller machines (ATM), and vending machines. FIG. 19 illustrates specific examples of these electronic devices.

Figure 19A:
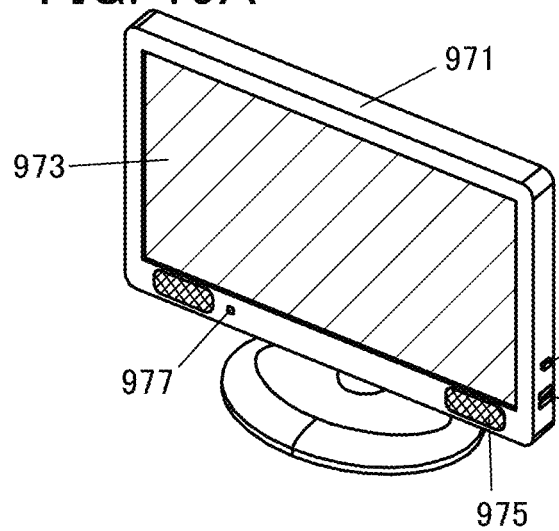
FIG. 19 Diagrams illustrating examples of electronic devices.

FIG. 19(A) illustrates a television, which includes a housing 971, a display portion 973, an operation key 974, speakers 975, a communication connection terminal 976, an optical sensor 977, and the like. The display portion 973 includes a touch sensor that enables input operation. With the use of the liquid crystal display device of one embodiment of the present invention for the display portion 973, display can be performed with the number of grayscale levels greater than or equal to the number of bits that can be output from the source driver.

Figure 19B:
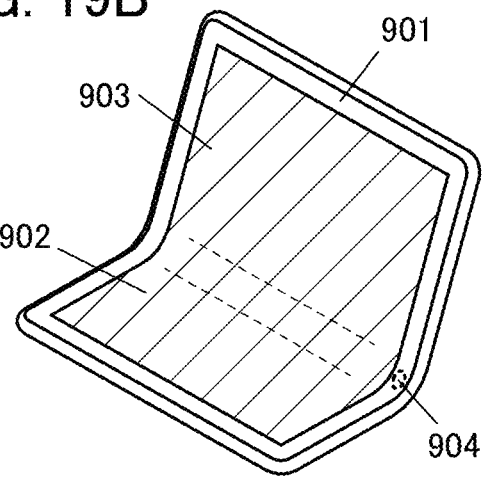

FIG. 19(B) illustrates an information processing terminal, which includes a housing 901, a display portion 902, a display portion 903, a sensor 904, and the like. The display portion 902 and the display portion 903 are formed using one display panel and are flexible. The housing 901 is also flexible, can be used in a bent state as illustrated, and can be used in a flat plate-like shape like a tablet terminal. The sensor 904 can sense the shape of the housing 901, and for example, it is possible to switch display on the display portion 902 and the display portion 903 when the housing 901 is bent. With the use of the liquid crystal display device of one embodiment of the present invention for the display portion 902 and the display portion 903, display can be performed with the number of grayscale levels greater than or equal to the number of bits that can be output from the source driver.

Figure 19C:
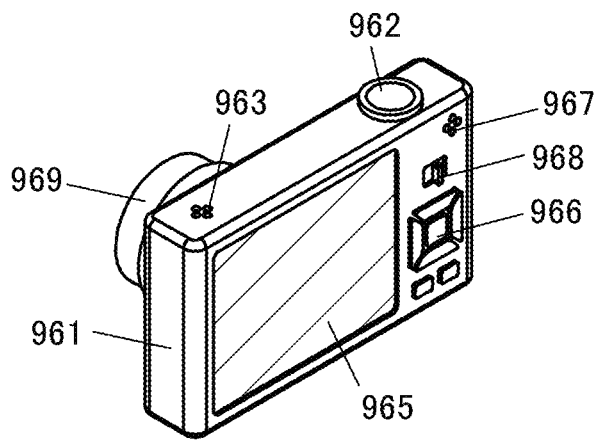

FIG. 19(C) illustrates a digital camera, which includes a housing 961, a shutter button 962, a microphone 963, a speaker 967, a display portion 965, operation keys 966, a zoom lever 968, a lens 969, and the like. With the use of the liquid crystal display device of one embodiment of the present invention for the display portion 965, display can be performed with the number of grayscale levels greater than or equal to the number of bits that can be output from the source driver.

Figure 19D:
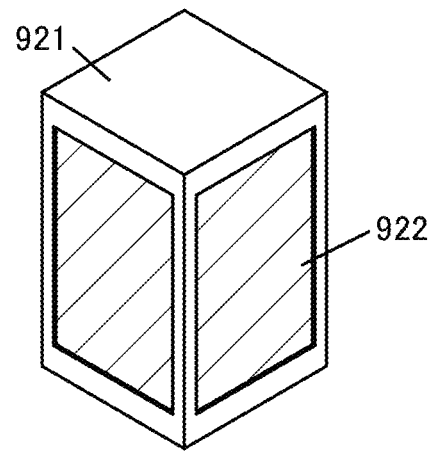

FIG. 19(D) illustrates a digital signage, which has a large display portion 922 attached on a side surface of a pillar 921. With the use of the liquid crystal display device of one embodiment of the present invention for the display portion 922, display can be performed with the number of grayscale levels greater than or equal to the number of bits that can be output from the source driver.

Figure 19E:
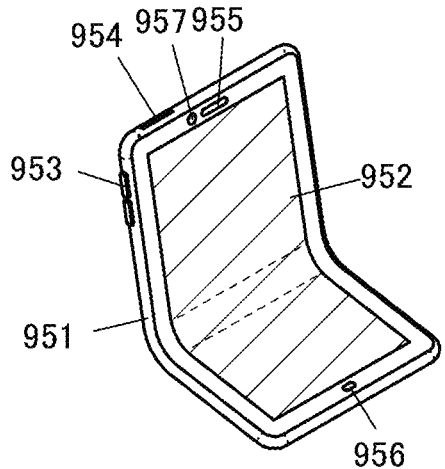

FIG. 19(E) illustrates an example of a cellular phone, which includes a housing 951, a display portion 952, an operation button 953, an external connection port 954, a speaker 955, a microphone 956, a camera 957, and the like. The display portion 952 of the cellular phone includes a touch sensor. Operations such as making a call and inputting text can be performed by touching the display portion 952 with a finger, a stylus, or the like. The housing 951 and the display portion 952 have flexibility and can be used in a bent state as illustrated. With the use of the liquid crystal display device of one embodiment of the present invention for the display portion 952, display can be performed with the number of grayscale levels greater than or equal to the number of bits that can be output from the source driver.

Figure 19F:
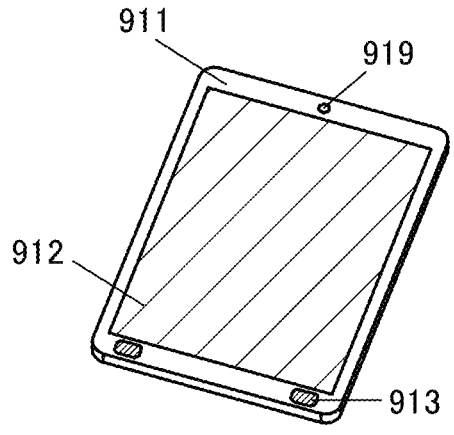

FIG. 19(F) illustrates a portable data terminal, which includes a housing 911, a display portion 912, speakers 913, a camera 919, and the like. A touch panel function of the display portion 912 enables input and output of information. With the use of the liquid crystal display device of one embodiment of the present invention for the display portion 912, display can be performed with the number of grayscale levels greater than or equal to the number of bits that can be output from the source driver.

This embodiment can be implemented in combination with any of the structures described in the other embodiments and the like as appropriate.

Example

In this example, whether an output obtained by addition of the signals $W_1$ and $W_2$ and the data signals data_1 and data_2 in the pixel circuit with the structure illustrated in FIG. 1(B) has a desired grayscale level was examined using a circuit simulation.

The parameters used for the circuit simulation are as follows: all of the transistors had a size of L (channel length)/W (channel width)=4 μm/4 μm. The capacitance of the capacitors C1 and C2 was 500 fF, and the capacitance of the capacitor C3 was 100 fF. The liquid crystal element LC was approximated to a parallel-plate capacitor and the capacitance was 50 fF. The wirings COM and TCOM were set at 0 V. The minimum value and the maximum value of the signal $W_1$, the signal $W_2$, the signal data_1, and the signal data_2 were set at −5 V and +5 V, respectively. Note that SPICE was used as the circuit simulation software.

Figure 20:
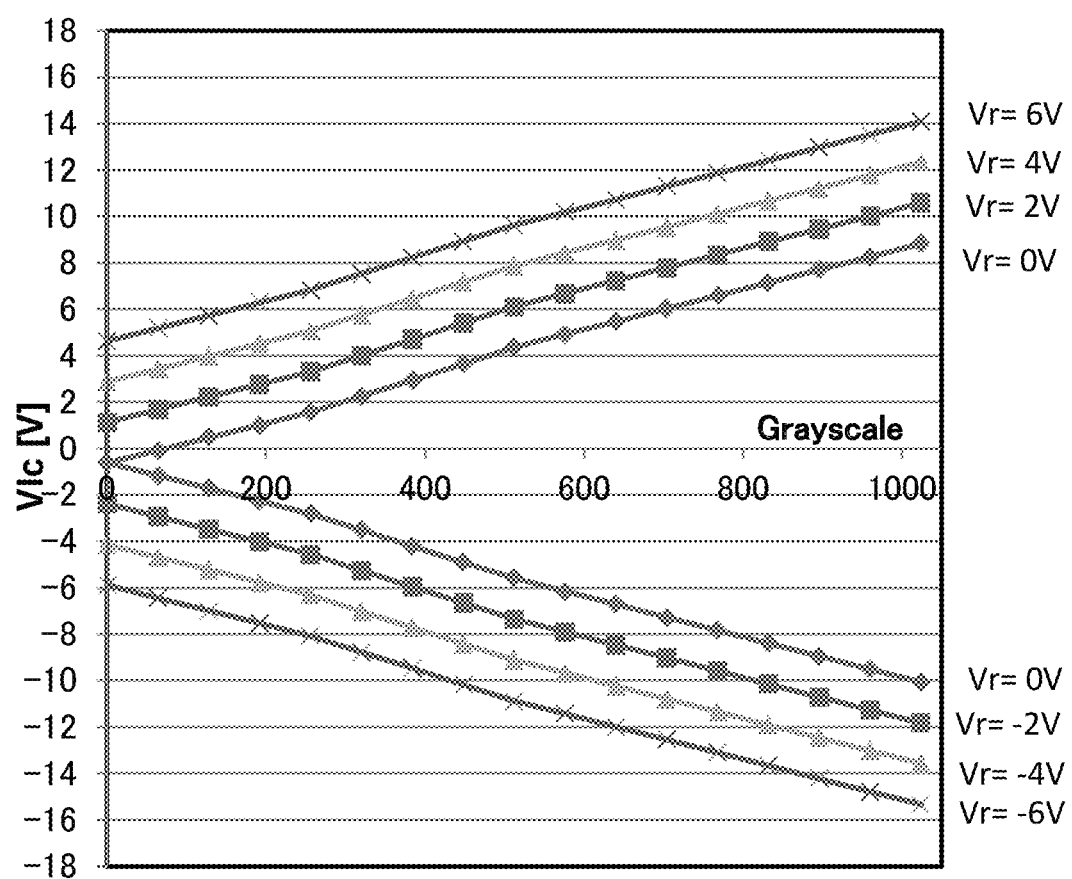
FIG. 20 A graph illustrating an operation example of a liquid crystal display device.

FIG. 20 is a graph that estimates how the voltage (Vg) applied to the liquid crystal element LC changes with respect to the grayscale level that can be expressed by changing each of the signal $W_1$, the signal $W_2$, the signal data_1, and the signal data_2 and adding a plurality of signals (the grayscale level corresponds to 10 bits, from 0 to 1024). In FIG. 20, the offset voltage Vr is changed by 2 V from −6 V to 6 V, and the signal $W_1$, the signal $W_2$, the signal data_1, and the signal data_2 were changed to estimate how the voltage (Vlc) applied to the liquid crystal element LC changes.

It is found in the above graph illustrated in FIG. 20 that by operating the pixel illustrated in FIG. 1(B) with the operation methods described in FIG. 2 and FIG. 3, favorable grayscale display can be performed.

REFERENCE NUMERALS

C1: capacitor, C2: capacitor, C3: capacitor, DL_1: wiring, DL_2: wiring, DL_3: wiring, GL_: wiring, GL_2: wiring, GL_3: wiring, M1: transistor, M2: transistor, M3: transistor, MEM1: memory circuit, MEM2: memory circuit, 100: liquid crystal display device, 110: display portion, 130: gate driver, 140: source driver

The invention claimed is:

1. A liquid crystal display device comprising:
a pixel comprising a first memory circuit, a second memory circuit, and a liquid crystal element,
wherein the first memory circuit comprises a first capacitor,
wherein one electrode of the first capacitor is electrically connected to one electrode of the liquid crystal element,
wherein the second memory circuit comprises a second capacitor,
wherein one electrode of the second capacitor is electrically connected to the one electrode of the liquid crystal element,
wherein the first memory circuit has a function of storing a charge corresponding to a first signal supplied from a first wiring,
wherein the second memory circuit has a function of storing a charge corresponding to a second signal supplied from the first wiring, and
wherein a voltage is applied to the liquid crystal element by supplying a third signal supplied from a second wiring to the other electrode of the first capacitor and supplying a fourth signal supplied from a third wiring to the other electrode of the second capacitor.

2. The liquid crystal display device according to claim 1,
wherein the first memory circuit comprises a first transistor, a second transistor, and the first capacitor,
wherein the second memory circuit comprises the second transistor, a third transistor, and the second capacitor,
wherein the first transistor to the third transistor comprise a metal oxide in channel formation regions, and the metal oxide comprises In, Zn, and M, and
wherein M is Al, Ti, Ga, Sn, Y, Zr, La, Ce, Nd, or Hf.

3. The liquid crystal display device according to claim 2,
wherein the pixel is electrically connected to the first wiring that supplies the first signal or the second signal,
wherein the pixel is electrically connected to the second wiring that supplies a reference voltage or the third signal,
wherein the pixel is electrically connected to the third wiring that supplies the reference voltage or the fourth signal,
wherein the first transistor has a function of controlling a conduction state between the second wiring and the other electrode of the first capacitor,
wherein the second transistor has a function of controlling a conduction state between the first wiring, the one electrode of the first capacitor and the one electrode of the second capacitor, and
wherein the third transistor has a function of controlling a conduction state between the third wiring and the other electrode of the second capacitor.

4. The liquid crystal display device according to claim 2,
wherein a gate of the first transistor is electrically connected to a fifth wiring to which a signal that controls a conduction state of the first transistor is supplied,
wherein a gate of the second transistor is electrically connected to a sixth wiring to which a signal that controls a conduction state of the second transistor is supplied, and
wherein a gate of the third transistor is electrically connected to a seventh wiring to which a signal that controls a conduction state of the third transistor is supplied.

5. The liquid crystal display device according to claim 1,
wherein the pixel comprises a third capacitor,
wherein one electrode of the third capacitor is electrically connected to the one electrode of the liquid crystal element, and
wherein the other electrode of the third capacitor is electrically connected to a fourth wiring that has a function of supplying a common potential.

6. An electronic device comprising the liquid crystal display device according to claim 1, and a camera.

7. A driving method of a liquid crystal display device comprising:
  a pixel comprising a first memory circuit, a second memory circuit, and a liquid crystal element,
  wherein the first memory circuit comprises a first capacitor,
  wherein the second memory circuit comprises a second capacitor,
  wherein by supplying one electrode of the first capacitor with a reference voltage supplied from a second wiring and the other electrode of the first capacitor with a first signal supplied from a first wiring, a charge corresponding to the first signal is stored in the first memory circuit,
  wherein by supplying one electrode of the second capacitor with the reference voltage and the other electrode of the second capacitor with a second signal supplied from the first wiring, a charge corresponding to the second signal is stored in the second memory circuit, and
  wherein by supplying the one electrode of the first capacitor with a third signal and the one electrode of the second capacitor with a fourth signal supplied from a third wiring, a voltage is applied to one electrode of the liquid crystal element.

8. The driving method of the liquid crystal display device according to claim 7, wherein the first signal and the second signal are signals for performing inversion driving.

9. A liquid crystal display device comprising:
  a pixel comprising a first memory circuit, a second memory circuit, and a liquid crystal element,
  wherein the first memory circuit comprises a first capacitor,
  wherein one electrode of the first capacitor is electrically connected to one electrode of the liquid crystal element,
  wherein the second memory circuit comprises a second capacitor,
  wherein one electrode of the second capacitor is electrically connected to the one electrode of the liquid crystal element,
  wherein the first memory circuit has a function of storing a charge corresponding to a first signal,
  wherein the second memory circuit has a function of storing a charge corresponding to a second signal, and
  wherein a voltage is applied to the liquid crystal element by supplying a third signal via a different wiring that the one supplying the first signal to the other electrode of the first capacitor and supplying a fourth signal to the other electrode of the second capacitor.

10. The liquid crystal display device according to claim 9, wherein the pixel comprises a first transistor, a second transistor, and a third transistor, and
  wherein neither of the first to third transistors are directly connected to each other.

* * * * *